(12) United States Patent
Liu et al.

(10) Patent No.: US 12,319,277 B2
(45) Date of Patent: Jun. 3, 2025

(54) METHOD AND APPARATUS FOR CONTROLLING AUTOMATED VEHICLE

(71) Applicant: Shenzhen Yinwang Intelligent Technologies Co., Ltd., Shenzhen (CN)

(72) Inventors: Nan Liu, Beijing (CN); Mingchao Li, Beijing (CN); Linlin Sui, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 425 days.

(21) Appl. No.: 17/847,907

(22) Filed: Jun. 23, 2022

(65) Prior Publication Data
US 2022/0324438 A1    Oct. 13, 2022

Related U.S. Application Data

(63) Continuation of application No. PCT/CN2019/128101, filed on Dec. 24, 2019.

(51) Int. Cl.
*B60W 30/09* (2012.01)
*B60W 30/16* (2020.01)
(Continued)

(52) U.S. Cl.
CPC ............ *B60W 30/09* (2013.01); *B60W 30/16* (2013.01); *B60W 30/18145* (2013.01); *B60W 50/0205* (2013.01); *B60W 50/14* (2013.01); *B60W 2552/30* (2020.02); *B60W 2554/20* (2020.02); *B60W 2554/802* (2020.02); *B60W 2556/40* (2020.02); *B60W 2556/45* (2020.02)

(58) Field of Classification Search
CPC ..... B60W 2554/20; B60W 2554/4041; B60W 2554/802; B60W 2555/20; B60W 2556/40; B60W 2556/45; B60W 2556/50; B60W 2556/65; B60W 30/09; B60W 30/16; B60W 30/181; B60W 30/18145; B60W 50/0205; B60W 50/035; B60W 50/14; B60W 60/0017; G08G 1/0141; G08G 1/096725; G08G 1/096741; G08G 1/096783
See application file for complete search history.

(56) References Cited

U.S. PATENT DOCUMENTS

2013/0131925 A1* 5/2013 Isaji ................ B60W 30/18145
701/41
2015/0345964 A1* 12/2015 Oooka ................ B60W 30/143
701/41
(Continued)

FOREIGN PATENT DOCUMENTS

CN      101152842 A    4/2008
CN      101712321 A    5/2010
(Continued)

*Primary Examiner* — Babar Sarwar
(74) *Attorney, Agent, or Firm* — Leydig, Voit & Mayer, Ltd.

(57) ABSTRACT

Monitoring driving safety information before a vehicle enters a curve or when the vehicle has entered the curve; obtaining a position of the vehicle in response to the driving safety information; obtaining curve information, where the curve information includes at least one of a position of a start point of the curve and a position of an end point of the curve; and controlling, based on the position of the vehicle and the curve information, the vehicle to stop at a position outside the curve.

29 Claims, 17 Drawing Sheets

(51) Int. Cl.
    *B60W 30/18*    (2012.01)
    *B60W 50/02*    (2012.01)
    *B60W 50/14*    (2020.01)

(56) References Cited

U.S. PATENT DOCUMENTS

| | | | | |
|---|---|---|---|---|
| 2016/0090100 | A1* | 3/2016 | Oyama | B62D 15/025 |
| | | | | 701/23 |
| 2016/0096430 | A1* | 4/2016 | Park | B60W 50/14 |
| | | | | 701/70 |
| 2017/0297567 | A1* | 10/2017 | Matsumura | B60W 40/08 |
| 2018/0292833 | A1* | 10/2018 | You | G05D 1/0274 |
| 2020/0346643 | A1* | 11/2020 | Woon | B60W 60/00276 |
| 2022/0392342 | A1* | 12/2022 | Fields | H04N 23/65 |

FOREIGN PATENT DOCUMENTS

| | | | | |
|---|---|---|---|---|
| CN | 107284442 A | | 10/2017 | |
| CN | 108058704 A | | 5/2018 | |
| CN | 109782758 A | | 5/2019 | |
| CN | 110136483 A | | 8/2019 | |
| CN | 110550024 A | | 12/2019 | |
| CN | 110562133 A | | 12/2019 | |
| EP | 1096460 A2 | * | 5/2001 | ............. G08G 1/164 |
| EP | 3232286 A1 | * | 10/2017 | ............. B60K 28/06 |
| EP | 3052356 B1 | * | 2/2021 | .......... B60W 30/165 |
| JP | 2007241471 A | | 9/2007 | |
| JP | 2010018075 A | | 1/2010 | |
| JP | 2013126854 A | | 6/2013 | |
| JP | 2015228090 A | | 12/2015 | |
| JP | 2017144861 A | | 8/2017 | |
| WO | WO-2019106787 A1 | * | 6/2019 | ........... B60K 28/066 |

* cited by examiner

METHOD AND APPARATUS FOR CONTROLLING AUTOMATED VEHICLE

CROSS-REFERENCE TO RELATED APPLICATIONS

This application is a continuation of International Application No. PCT/CN2019/128101, filed on Dec. 24, 2019, the disclosure of which is hereby incorporated by reference in its entirety.

TECHNICAL FIELD

This application relates to the fields of vehicle safety and vehicle driving automation, and in particular, to a method and an apparatus for controlling an automated vehicle.

BACKGROUND

As a car parc continuously increases, problems such as traffic jams, road safety and environmental pollution caused by automobiles are becoming more serious. An intelligent connected vehicle based on an automated driving technology and networked communications technology emerges as the times demand. Through intelligent information exchange and sharing between a vehicle and X (a person, a road, a vehicle, a cloud, and the like), safe, efficient, comfortable, and energy-saving driving of an automated vehicle is implemented.

Currently, when a high-level automated driving system (ADS) controls a vehicle, the automated driving system replaces a person to complete driving environment monitoring and vehicle driving operations on the vehicle. For example, the automated driving system is a highway pilot (HWP) system. If an automated driving system failure occurs in a vehicle running on a highway (for example, a sensor is faulty, software has a bug, or heavy fog/heavy rain in a driving environment exceeds a limit preset in the automated driving system), the vehicle no longer meets a driving environmental condition allowed by automated driving, and the HWP system sends a take over request that a driver controls the vehicle to continue driving. If the driver does not respond, the HWP system starts minimum risk control based on a failure of a specific component or function of the vehicle to immediately stop the vehicle or change lanes to stop the vehicle, to enable the vehicle to reach a minimum risk condition, and keep the vehicle and a person in the vehicle away from a potential injury risk.

Although a current minimum risk control strategy can enable a vehicle to stop as soon as possible when the automated driving system fails, there are still accidents such as a rear-end collision with a stopped vehicle due to untimely response of a vehicle behind. This reduces safety of vehicle travel.

SUMMARY

Embodiments of this application disclose a method and an apparatus for controlling an automated vehicle, to avoid a risk of accidents such as a rear-end collision caused by a vehicle stopping in a curve, and improve driving safety of an automated vehicle.

According to a first aspect, an embodiment of this application provides a method for controlling an automated vehicle. The method includes: monitoring driving safety information before a vehicle enters a curve or when the vehicle has entered the curve; obtaining a position of the vehicle in response to the driving safety information; obtaining curve information, where the curve information includes at least one of a position of a start point of the curve and a position of an end point of the curve; and controlling, based on the position of the vehicle and the curve information, the vehicle to stop at a position outside the curve.

The curve in this embodiment of this application is a road section that is of a highway, a first-class road, a second-class road, a third-class road, or a fourth-class road and whose curvature radius is less than or equal to 800 meters. The start point of the curve indicates the start of the curve, and the end point of the curve indicates the end of the curve. In this embodiment of this application, the start point and the end point of the curve are defined based on a running direction of a lane in which the vehicle is located. To be specific, a position at which the vehicle just enters the curve when the vehicle runs toward the curve may be defined as the start point, and a position at which the vehicle just exits the curve when the vehicle leaves the curve may be defined as the end point. For example, an entrance of the curve may be defined as the start point of the curve, and an exit of the curve may be defined as the end point of the curve. Correspondingly, "before a vehicle enters a curve" in this embodiment of this application means that the position of the vehicle is before the start point of the curve, and "when the vehicle has entered the curve" in this embodiment of this application means that the position of the vehicle is between the start point of the curve and the end point of the curve. Certainly, the start point and the end point of the curve may be defined in another manner.

The driving safety information is information that affects driving safety of the vehicle or causes the vehicle to exit an automated driving state for a stop. In a possible implementation, the driving safety information may be generated by the vehicle, or may be sent to the vehicle by a road side unit (RSU), a base station, or another vehicle.

It may be learned that, in this embodiment of this application, the vehicle may monitor the driving safety information in real time. When the vehicle detects the driving safety information near or in the curve, the vehicle controls the vehicle based on a current vehicle position and the curve information, for example, controls the vehicle to brake, shift gears, slow down, or change lanes, to ensure that the vehicle finally stops at the position outside the curve, for example, stops before entering the curve or after passing through the curve. By implementing this embodiment of this application, the vehicle can be stopped outside the curve. Because a road outside the curve is usually a straight road, and there are fewer driving blind spots, it is ensured that a vehicle behind has a sufficiently good field of view and a sufficiently long reaction time to take an avoidance measure in time. This avoids a rear-end collision accident between vehicles. Based on the first aspect, in a possible embodiment, the driving safety information is system fault information; the system fault information indicates that a system fault occurs in the vehicle; and the monitoring driving safety information includes: obtaining the system fault information by detecting a system status of the vehicle.

It can be learned that the driving safety information may be the system fault information of the vehicle, and a fault severity of the vehicle affects the driving safety of the vehicle, so that the vehicle needs a stop. The system fault information may be, for example, a side-rear sensor fault of the vehicle, insensitivity of a steering mechanism, a bug in system software, or insensitivity of a brake mechanism. In other words, when a system fault occurs in an automated vehicle, in order to ensure the safety of the vehicle, the vehicle may automatically exit an automated driving state and enable a stopping control strategy, or use a corresponding stopping control strategy when there is no response within a preset period of time after a take over request is proposed, to keep the vehicle and a person in the vehicle away from a potential injury risk.

Based on the first aspect, in a possible embodiment, the driving safety information is environmental risk information; the environmental risk information indicates that a driving environment of the vehicle does not meet a risk condition preset in an automated driving system; and the monitoring driving safety information includes: obtaining the environmental risk information by detecting a condition of an environment in which the vehicle is located.

It can be learned that the driving safety information may be the environmental risk information. No fault occurs in the vehicle. However, because the vehicle is an automated vehicle, and the automated driving system has a preset environmental condition, when the vehicle detects that some parameters of a current environment exceed the preset environmental condition of the automated driving system, safe driving of the vehicle is affected, and the vehicle needs to be stopped. The environmental risk information may be, for example, that a parameter such as rainfall/snowfall/heavy fog density of an environment in which the vehicle is located does not meet an environmental parameter preset for automated driving, or that a type of a road section on which the vehicle is to be driven does not meet a road section type preset in the automated driving system. In other words, when an environment in which an automated vehicle is located changes dramatically, in order to ensure the driving safety of the vehicle, the vehicle may automatically exit an automated driving state and enable a stopping control strategy, or use a corresponding stopping control strategy when there is no response within a preset period of time after a take over request is proposed, to keep the vehicle and a person in the vehicle away from a potential injury risk.

Based on the first aspect, in a possible embodiment, the driving safety information is curve obstacle information; the curve obstacle information indicates that there is an obstacle blocking traffic in the curve; and the monitoring driving safety information includes: receiving the curve obstacle information sent by a road side unit (RSU).

It can be learned that the driving safety information may be the curve obstacle information. In this case, no fault occurs in the vehicle, and a current driving environment of the vehicle meets an environmental condition preset in the automated driving system. However, because an obstacle (for example, a large rock, a fallen tree, ground collapse, or a damaged vehicle, or a vehicle parked temporarily at the curve) exists in the curve and blocks passage of the curve, the vehicle needs to be stopped in time from entering the curve. In other words, an RSU disposed near the curve may detect a smooth state of the curve in real time. When finding that an obstacle exists in the curve, the RSU generates curve obstacle information and sends the curve obstacle information to the vehicle, where the curve obstacle information is used to indicate that there is an obstacle blocking traffic in the curve. After the vehicle receives the curve obstacle information, in order to ensure the driving safety of the vehicle, the vehicle exits the automated driving system and uses a corresponding stopping control strategy, or uses a corresponding stopping control strategy when there is no response within a preset period of time after a take over request is proposed, to keep the vehicle and a person in the vehicle away from a potential injury risk.

Based on the first aspect, in a possible embodiment, the obtaining curve information includes: receiving the curve information sent by a road side unit (RSU).

Based on the first aspect, in a possible embodiment, the obtaining curve information includes: receiving motion trail information sent by a reference vehicle that has entered the curve; and processing the motion trail information, to obtain the curve information.

Based on the first aspect, in a possible embodiment, the obtaining curve information includes: processing map data in the vehicle to obtain the curve information.

Based on the first aspect, in a possible embodiment, the controlling, based on the position of the vehicle and the curve information, the vehicle to stop at a position outside the curve includes: determining a relative position relationship between the vehicle and the curve based on the position of the vehicle and the curve information, where the relative position relationship indicates that the vehicle has not entered the curve or has entered the curve; and controlling, based on the relative position relationship, the vehicle to stop at the position outside the curve.

It can be learned that, in this application, a stopping strategy of the vehicle is determined by determining the relative position relationship between the vehicle and the curve, to ensure that the vehicle stops at a safe position outside the curve, to avoid a rear-end collision with a vehicle behind. This reduces accidents on a curve section, and improves the driving safety of the automated vehicle.

Based on the first aspect, in a possible embodiment, the controlling, based on the relative position relationship, the vehicle to stop at a position outside the curve includes: if the relative position relationship indicates that the vehicle has not entered the curve, controlling the vehicle to stop at a position before the start point of the curve or controlling the vehicle to stop at a position after the end point of the curve; and controlling, if the relative position relationship indicates that the vehicle has entered the curve, the vehicle to stop at a position after the end point of the curve.

It can be learned that when the driving safety information is monitored, if the vehicle has not entered the curve, the vehicle is stopped before entering the curve or is driven into the curve and stopped after the end point of the curve (in this case, the driving safety information is not curve obstacle information). If the vehicle has entered a curve, the vehicle is stopped at a position after the end point of the curve.

Based on the first aspect, in a possible embodiment, the controlling, if the relative position relationship indicates that the vehicle has entered the curve, the vehicle to stop at a position after the curve includes: obtaining a first safety distance, where the safety distance is a maximum braking distance for preventing a vehicle behind from colliding with the vehicle; and controlling the vehicle to stop at a position that is greater than or equal to the first safety distance from the end point of the curve.

It can be learned that, considering that a field of view of the vehicle behind in the curve is limited, in this application, a distance between a stopping position of the vehicle and the end point of the curve is greater than or equal to the first safety distance, so that the vehicle behind has sufficient reaction time to take an avoidance measure to avoid collision with a stopped vehicle. Relative to a positive extreme distance of the vehicle behind, the first safety distance is a maximum braking distance determined by considering factors such as a speed of the vehicle behind, a reaction time for detecting a parked vehicle in front, and a braking force of the vehicle behind.

Based on the first aspect, in a possible embodiment, the curve information further includes a curvature radius of the curve; and the obtaining a first safety distance includes: obtaining the first safety distance based on the curvature radius of the curve.

In this embodiment of this application, the first safety distance is used to prevent the vehicle behind in the curve from colliding with a stopped vehicle at the end point of the curve due to a limited field of view.

Based on the first aspect, in a possible embodiment, the method further includes: receiving steering wheel rotation angle information sent by the reference vehicle that has entered the curve, where the curvature radius of the curve is obtained through processing based on the steering wheel rotation angle information.

Based on the first aspect, in a possible embodiment, the obtaining the first safety distance based on the curvature radius of the curve includes: performing calculation based on the curvature radius of the curve, to obtain a safety speed of the vehicle; and obtaining the first safety distance based on the curvature radius of the curve and the safety speed.

It can be learned that the first safety distance may be obtained by the vehicle through calculation based on the obtained curvature radius.

Based on the first aspect, in a possible embodiment, the obtaining the first safety distance based on the curvature radius of the curve includes: searching for mapping information based on the curvature radius of the curve, to obtain the first safety distance, where the mapping information includes a mapping relationship between a combination of a safety speed and the curvature radius and a safety distance.

It can be learned that the first safety distance may be obtained by searching for the mapping information. The mapping information is a mapping relationship between the curvature radius of the curve, the safety speed, and the safety distance, and the mapping information may be prestored in the vehicle, may be sent by the road side unit, or may be sent by a server.

Based on the first aspect, in a possible embodiment, when it is detected that there is a parked vehicle at the position that is greater than or equal to the first safety distance from the end point of the curve, the method further includes: obtaining a position of the parked vehicle. The controlling the vehicle to stop at a position that is greater than or equal to the first safety distance from the end point of the curve includes: obtaining a second safety distance based on the position of the parked vehicle and the first safety distance, where the second safety distance is greater than the first safety distance; and controlling the vehicle to stop at a position that is greater than or equal to the second safety distance from the end point of the curve.

It can be learned that, when the vehicle obtains the first safety distance, a final stopping position of the vehicle after the vehicle exits the curve is obtained. However, if it is detected that there is another parked vehicle at a preset final stopping position when the vehicle approaches the end point of the curve, the vehicle may obtain the second safety distance based on a position of the detected another parked vehicle and the first safety distance, to obtain a new stopping position after the curve.

Based on the first aspect, in a possible embodiment, if it is detected that there is a parked vehicle at the position that is greater than or equal to the first safety distance from the end point of the curve, the controlling the vehicle to stop at a position that is greater than or equal to the first safety distance from the end point of the curve specifically includes: controlling the vehicle to stop at a position in an adjacent lane of a lane in which the parked vehicle that is greater than or equal to the first safety distance from the end point of the curve is located.

It can be learned that the adjacent lane may be a left or right adjacent lane of a straight lane after the vehicle exits the curve, or may be an emergency stopping area on the rightmost side of a road after the vehicle exits the curve.

Based on the first aspect, in a possible embodiment, after the controlling, based on the position of the vehicle and the curve information, the vehicle to stop at a position outside the curve, the method further includes performing at least one of the following: indicating the vehicle to turn on hazard warning signal lights to perform danger signal alerting; indicating the vehicle to start an automatic shutdown instruction to shut down an engine; indicating a door to be automatically unlocked when the door is locked; and indicating the vehicle to activate an emergency rescue system.

Based on the first aspect, in a possible embodiment, the obtaining curve information includes: receiving the curve information sent by a cloud server.

Based on the first aspect, in a possible embodiment, the obtaining a position of the parked vehicle includes: receiving the position of the parked vehicle sent by the road side unit (RSU).

Based on the first aspect, in a possible embodiment, the obtaining a position of the parked vehicle includes: receiving the position of the parked vehicle sent by the parked vehicle.

It can be learned that, in this embodiment of this application, when emergency driving safety information is monitored before the vehicle enters the curve or after the vehicle enters the curve, automatic control of the vehicle can be implemented, so that the vehicle can stop at a safe position outside the curve. This avoids a risk of accidents such as a rear-end collision caused by the vehicle stopping in the curve. The vehicle is controlled to stop at a position a distance from the end point of the curve after the vehicle exits the curve, so that the vehicle behind in the curve has sufficient reaction time to take an avoidance measure to avoid collision with a stopped vehicle in front. This reduces accidents on a curve section, and improves the driving safety of the automated vehicle.

According to a second aspect, an embodiment of this application provides an apparatus for controlling an automated vehicle. The apparatus includes: a monitoring apparatus, configured to monitor driving safety information before a vehicle enters a curve or when the vehicle has entered the curve, where the monitoring apparatus includes a sensor or a transceiver disposed on the vehicle; a positioning apparatus, configured to obtain a position of the vehicle in response to the driving safety information, where the transceiver is further configured to obtain curve information, and the curve information includes at least one of a position of a start point of the curve and a position of an end point of the curve; and a processor, configured to control, based on the position of the vehicle and the curve information, the vehicle to stop at a position outside the curve.

It can be learned that the monitoring apparatus may be hardware that is in the vehicle and that can detect or indicate a system status of the vehicle, for example, a sensor such as a radar, an inertial measurement unit, a lidar, a global positioning system, or a camera, a steering mechanism, a brake mechanism, or other hardware. Alternatively, the monitoring apparatus may be a sensor that is in the vehicle and that can detect an environmental parameter, for example, a rainfall sensor, an illumination sensor, or a fog density detector. Alternatively, the monitoring apparatus may be a transceiver in the vehicle, and may be configured to receive driving safety information sent by a road side unit, a server, or the like.

The positioning apparatus in this embodiment of this application may be one or more of a global positioning system (GPS), an assisted global positioning system (AGPS), a Mapbar positioning system (MPS), a BeiDou satellite positioning system, a global navigation satellite system (GLONASS), a Galileo satellite positioning system, or the like in the vehicle.

Based on the second aspect, in a possible embodiment, the driving safety information is system fault information; the system fault information indicates that a system fault occurs in the vehicle; and the sensor is specifically configured to: obtain the system fault information by detecting the system status of the vehicle.

Based on the second aspect, in a possible embodiment, the driving safety information is environmental risk information; the environmental risk information indicates that a driving environment of the vehicle does not meet a risk condition preset in an automated driving system; and the sensor is specifically configured to: obtain the environmental risk information by detecting a condition of an environment in which the vehicle is located.

Based on the second aspect, in a possible embodiment, the driving safety information is curve obstacle information; the curve obstacle information indicates that there is an obstacle blocking traffic in the curve; and the transceiver is specifically configured to: receive the curve obstacle information sent by a road side unit (RSU).

Based on the second aspect, in a possible embodiment, the transceiver is specifically configured to: receive the curve information sent by a road side unit (RSU).

Based on the second aspect, in a possible embodiment, the processor is specifically configured to: obtain the curve information provided by map data in the vehicle.

Based on the second aspect, in a possible embodiment, the transceiver is further configured to receive motion trail information sent by a reference vehicle that has entered the curve; and the processor is specifically configured to process the motion trail information, to obtain the curve information.

Based on the second aspect, in a possible embodiment, the processor is specifically configured to: determine a relative position relationship between the vehicle and the curve based on the position of the vehicle and the curve information, where the relative position relationship indicates that the vehicle has not entered the curve or has entered the curve; and control, based on the relative position relationship, the vehicle to stop at the position outside the curve.

Based on the second aspect, in a possible embodiment, the processor is specifically configured to: if the relative position relationship indicates that the vehicle has not entered the curve, control the vehicle to stop at a position before the start point of the curve or control the vehicle to stop at a position after the end point of the curve; and if the relative position relationship indicates that the vehicle has entered the curve, control the vehicle to stop at a position after the end point of the curve.

Based on the second aspect, in a possible embodiment, if the relative position relationship indicates that the vehicle has entered the curve, the processor is specifically configured to: obtain a first safety distance, where the safety distance is a maximum braking distance for preventing a vehicle behind from colliding with the vehicle; and control the vehicle to stop at a position that is greater than or equal to the first safety distance from the end point of the curve.

Based on the second aspect, in a possible embodiment, the transceiver is further configured to receive steering wheel rotation angle information sent by the reference vehicle that has entered the curve; and the processor is specifically configured to process the steering wheel rotation angle information, to obtain the curvature radius.

Based on the second aspect, in a possible embodiment, the curve information further includes the curvature radius of the curve; and the processor is specifically configured to: obtain the first safety distance based on the curvature radius of the curve.

Based on the second aspect, in a possible embodiment, the processor is specifically configured to: perform calculation based on the curvature radius of the curve, to obtain a safety speed of the vehicle; and obtain the first safety distance based on the curvature radius of the curve and the safety speed.

Based on the second aspect, in a possible embodiment, the processor is specifically configured to: search for mapping information based on speed information of the vehicle and the curvature radius of the curve, to obtain the first safety distance, where the mapping information includes a mapping relationship between a combination of the speed and the curvature radius and a safety distance.

Based on the second aspect, in a possible embodiment, if it is detected that there is a parked vehicle at the position that is greater than or equal to the first safety distance from the end point of the curve, the processor is specifically configured to: obtain a position of the parked vehicle; obtain a second safety distance based on the position of the parked vehicle and the first safety distance, where the second safety distance is greater than the first safety distance; and control the vehicle to stop at a position that is greater than or equal to the second safety distance from the end point of the curve.

Based on the second aspect, in a possible embodiment, if it is detected that there is a parked vehicle at the position that is greater than or equal to the first safety distance from the end point of the curve, the processor is specifically configured to: control the vehicle to stop at a position in an adjacent lane of a lane in which the parked vehicle that is greater than or equal to the first safety distance from the end point of the curve is located.

Based on the second aspect, in a possible embodiment, the processor is further specifically configured to perform at least one of the following: indicating the vehicle to turn on hazard warning signal lights to perform danger signal alerting; indicating the vehicle to start an automatic shutdown instruction to shut down an engine; indicating a door to be automatically unlocked when the door is locked; and indicating the vehicle to activate an emergency rescue system.

Based on the second aspect, in a possible embodiment, the transceiver is specifically configured to: receive the curve information sent by a cloud server.

Based on the second aspect, in a possible embodiment, the transceiver is specifically configured to: receive the position of the parked vehicle sent by the road side unit (RSU).

Based on the second aspect, in a possible embodiment, the obtaining a position of the parked vehicle includes: receiving the position of the parked vehicle sent by the parked vehicle.

According to a third aspect, an embodiment of this application provides an apparatus for controlling an automated vehicle. The apparatus includes: a safety monitoring unit, configured to monitor driving safety information before a vehicle enters a curve or when the vehicle has entered the curve; an information obtaining unit, configured to obtain a position of the vehicle in response to the driving safety information, where the information obtaining unit is further configured to obtain curve information, and the curve information includes at least one of a position of a start point of the curve and a position of an end point of the curve; and a processing control unit, configured to control, based on the position of the vehicle and the curve information, the vehicle to stop at a position outside the curve.

Based on the third aspect, in a possible embodiment, the driving safety information is system fault information; the system fault information indicates that a system fault occurs in the vehicle; and the safety monitoring unit is specifically configured to: obtain the system fault information by detecting a system status of the vehicle.

Based on the third aspect, in a possible embodiment, the driving safety information is environmental risk information; the environmental risk information indicates that a driving environment of the vehicle does not meet a risk condition preset in an automated driving system; and the safety monitoring unit is specifically configured to: obtain the environmental risk information by detecting a condition of an environment in which the vehicle is located.

Based on the third aspect, in a possible embodiment, the driving safety information is curve obstacle information; the curve obstacle information indicates that there is an obstacle blocking traffic in the curve; and the safety monitoring unit is specifically configured to: receive the curve obstacle information sent by a road side unit (RSU).

Based on the third aspect, in a possible embodiment, the information obtaining unit is specifically configured to: receive the curve information sent by a road side unit (RSU).

Based on the third aspect, in a possible embodiment, the processing control unit is specifically configured to: process map data of the vehicle to obtain the curve information.

Based on the third aspect, in a possible embodiment, the information obtaining unit is specifically configured to: receive motion trail information sent by a reference vehicle that has entered the curve; and obtain the curve information based on the motion trail information.

Based on the third aspect, in a possible embodiment, the processing control unit is specifically configured to: determine a relative position relationship between the vehicle and the curve based on the position of the vehicle and the curve information, where the relative position relationship indicates that the vehicle has not entered the curve or has entered the curve; and control, based on the relative position relationship, the vehicle to stop at the position outside the curve.

Based on the third aspect, in a possible embodiment, the processing control unit is specifically configured to: if the relative position relationship indicates that the vehicle has not entered the curve, control the vehicle to stop at a position before the start point of the curve or control the vehicle to stop at a position after the end point of the curve; and if the relative position relationship indicates that the vehicle has entered the curve, control the vehicle to stop at a position after the end point of the curve.

Based on the third aspect, in a possible embodiment, if the relative position relationship indicates that the vehicle has entered the curve, the processing control unit is specifically configured to: obtain a first safety distance, where the safety distance is a maximum braking distance for preventing a vehicle behind from colliding with the vehicle; and control the vehicle to stop at a position that is greater than or equal to the first safety distance from the end point of the curve.

Based on the third aspect, in a possible embodiment, the information obtaining unit is further configured to receive steering wheel rotation angle information sent by the reference vehicle that has entered the curve; and the processing control unit is specifically configured to process the steering wheel rotation angle information, to obtain the curvature radius.

Based on the third aspect, in a possible embodiment, the curve information further includes the curvature radius of the curve; and the processing control unit is specifically configured to: obtain the first safety distance based on the curvature radius of the curve.

Based on the third aspect, in a possible embodiment, the processing control unit is specifically configured to: perform calculation based on the curvature radius of the curve, to obtain a safety speed of the vehicle; and obtain the first safety distance based on the curvature radius of the curve and the safety speed.

Based on the third aspect, in a possible embodiment, the processing control unit is specifically configured to: search for mapping information based on the curvature radius of the curve, to obtain the first safety distance, where the mapping information includes a mapping relationship between a combination of the safety speed and the curvature radius and a safety distance.

Based on the third aspect, in a possible embodiment, when it is detected that there is a parked vehicle at the position that is greater than or equal to the first safety distance from the end point of the curve, the information obtaining unit is further configured to obtain a position of the parked vehicle. The processing control unit is specifically configured to: obtain a second safety distance based on the position of the parked vehicle and the first safety distance, where the second safety distance is greater than the first safety distance; and control the vehicle to stop at a position that is greater than or equal to the second safety distance from the end point of the curve.

Based on the third aspect, in a possible embodiment, if it is detected that there is a parked vehicle at the position that is greater than or equal to the first safety distance from the end point of the curve, the processing control unit is specifically configured to: control the vehicle to stop at a position in an adjacent lane of a lane in which the parked vehicle that is greater than or equal to the first safety distance from the end point of the curve is located.

Based on the third aspect, in a possible embodiment, the information obtaining unit is specifically configured to: receive the curve information sent by a cloud server.

Based on the third aspect, in a possible embodiment, the information obtaining unit is specifically configured to: receive the position of the parked vehicle sent by the road side unit (RSU).

Based on the third aspect, in a possible embodiment, the information obtaining unit is specifically configured to: receive the position of the parked vehicle sent by the parked vehicle.

Based on the third aspect, in a possible embodiment, the processing control unit is further specifically configured to perform at least one of the following: indicating the vehicle to turn on hazard warning signal lights to perform danger signal alerting; indicating the vehicle to start an automatic shutdown instruction to shut down an engine; indicating a door to be automatically unlocked when the door is locked; and indicating the vehicle to activate an emergency rescue system.

According to a fourth aspect, an embodiment of this application provides a chip. The chip includes a processor and a data interface. The processor reads, through the data interface, instructions stored in a memory, to perform the method according to any one of the first aspect or the possible implementations of the first aspect.

Optionally, in an implementation, the chip may further include a memory. The memory stores instructions. The processor is configured to execute the instructions stored in the memory. When the instructions are executed, the processor is configured to perform the method according to any one of the first aspect or the possible implementations of the first aspect.

According to a fifth aspect, an embodiment of this application provides a computer-readable storage medium. The computer-readable storage medium stores program code to be executed by a device. The program code includes instructions for performing the method according to any one of the first aspect or the possible implementations of the first aspect.

According to a sixth aspect, an embodiment of this application provides a computer software product. The computer program software product includes program instructions. When the computer software product is executed by an apparatus, the apparatus performs the method according to the first aspect. The computer software product may be a software installation package. When the method provided in any possible design of the first aspect needs to be used, the computer software product may be downloaded and executed on the apparatus, to implement the method in the first aspect.

It may be learned that in the embodiments of this application, the driving safety information is monitored in real time. When the vehicle detects the driving safety information near or in the curve, the vehicle controls the vehicle based on a current position of the vehicle and the curve information, so that the vehicle finally stops at a position outside the curve. For example, the vehicle stops before entering the curve or after passing through the curve, to avoid a rear-end collision accident between a vehicle behind and the vehicle. This reduces accidents on a curve section, and improves the driving safety of the automated vehicle.

BRIEF DESCRIPTION OF THE DRAWINGS

To describe the technical solutions in the embodiments of this application more clearly, the following briefly describes the accompanying drawings for describing the embodiments. It is clear that the accompanying drawings in the following description show some embodiments of this application, and a person of ordinary skill in the art may still derive another drawing from these accompanying drawings without creative efforts.

DETAILED DESCRIPTION OF ILLUSTRATIVE EMBODIMENTS

Figure 1:
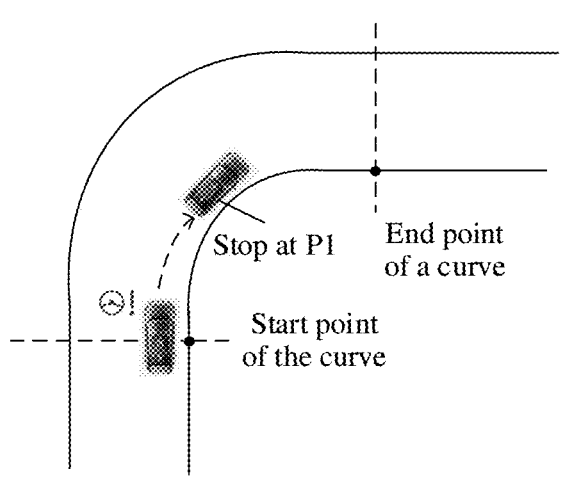
FIG. 1(1) and FIG. 1(2) are schematic diagrams of a scenario of controlling an automated vehicle in a conventional technology.
Figure 1:
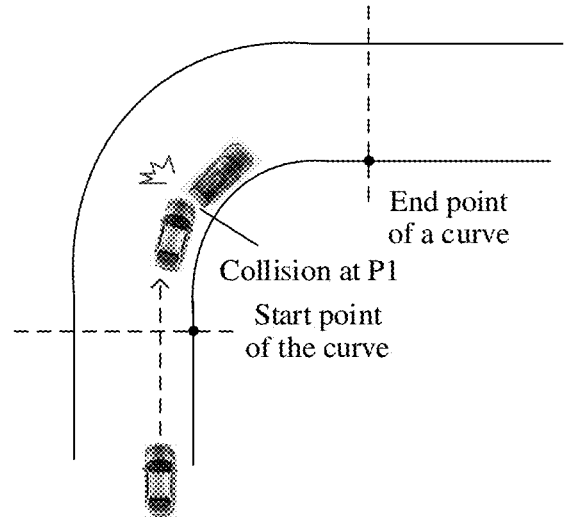

The following clearly describes the technical solutions in the embodiments of this application with reference to the accompanying drawings in the embodiments of this application. It is clear that the described embodiments are merely some but not all of the embodiments of this application. All other embodiments obtained by a person of ordinary skill in the art based on the embodiments of this application without creative efforts shall fall within the protection scope of this application.

It should be noted that the terms used in the embodiments of this application are merely for the purpose of illustrating specific embodiments, and are not intended to limit this application. The terms "a", "the", and "this" of singular forms used in the embodiments and the appended claims of this application are also intended to include plural forms, unless otherwise specified in a context clearly. In addition, the terms "include", "have", and any other variants thereof are intended to cover non-exclusive inclusion. It should also be understood that, the term "and/or" used in this specification indicates and includes any or all possible combinations of one or more associated listed items.

Because, this application relates to a minimum risk control method for an automated vehicle, for ease of understanding, the following first describes related terms and the like that may be used in the embodiments of this application.

(1) Intelligent Connected Vehicle

An intelligent connected vehicle (ICV) is an organic combination of an automated driving technology and a networked communications technology, and is a next-generation vehicle that is equipped with apparatuses such as an advanced on-board sensor, a controller, and an actuator, integrates modern communication and network technologies, to implement intelligent information exchange and sharing between the vehicle and X (a person, a vehicle, a road, a cloud, and the like), enable the vehicle to have functions such as complex environment sensing, intelligent decision-making, and collaborative control, achieve "safe, comfortable, energy-saving, environmental-friendly, and efficient" driving, and be able to eventually replace a person in operation.

(2) Automated Driving

An automated driving technology has evolved from a low-level advanced driver assistant system (ADAS) to a high-level automated driving system (ADS). Herein, the high-level automated driving system (ADS) means that the system continuously executes all dynamic driving tasks (DDTs) within an operational design domain (ODD) of the system. In other words, a machine system is allowed to undertake all tasks of automatic control of a vehicle only in a specified appropriate driving scenario, that is, the system is activated when the vehicle meets an ODD condition, and the system replaces a human driver as a driving subject of the vehicle. The dynamic driving tasks (DDTs) are to continuously perform transverse (left and right steering) and longitudinal motion control (acceleration, deceleration, and constant speed) on the vehicle, and detect and respond to a target and an event in a driving environment of the vehicle. The operational design domain (ODD) refers to a condition under which the automated driving system can operate safely. A set condition may include a geographical position, a road type, a speed range, weather, time, national and local traffic laws and regulations, and the like. A highway pilot (HWP) system is used as an example. The system recognizes that the vehicle is within the ODD (for example, the vehicle is currently running on a highway, the weather is clear, the vehicle is at a proper speed, a lighting condition is good, and a global positioning system (Global Positioning System, GPS) has stable signals), and the HWP system continues to execute all the DDTs after a driver confirms that the system is activated.

(3) Networked Communication

A networked communication technology is applied to vehicles, is usually referred to as an internet of vehicles, and is a large system network for performing wireless communication and information exchange between a vehicle and X (a vehicle, a road, a person, a cloud, and the like) based on an intra-vehicle network, an inter-vehicle network, and an in-vehicle mobile internet according to an agreed communications protocol and a data exchange standard, that is, the internet of vehicles can implement real-time online communication between vehicles, between a vehicle and an infrastructure, between a vehicle and a cloud, and the like. The communication between vehicles is also referred to as vehicle-to-vehicle (V2V) communication. The communication between a vehicle and an infrastructure is also referred to as vehicle-to-infrastructure (V2I) communication, that is, the vehicle communicates with a road through a roadside communications device. The communication between a vehicle and a cloud is also referred to as vehicle-to-network (V2N) communication, that is, the vehicle communicates with the cloud through a cellular network.

(4) Minimum Risk Condition

When a high-level automated driving system controls the driving of a vehicle, sometimes the vehicle needs to be out of an automated driving state for some reasons. When this happens, the automated driving system sends a take over request (Request to Intervene, RTI), to request a driver in the vehicle to take over the vehicle to continue executing all the dynamic driving tasks (DDTs) of the vehicle. If the driver does not respond to the take over request within a take over time preset in the system, the system enters a minimum risk maneuver (Minimal Risk Maneuver, MRM) mode and performs longitudinal control (acceleration, deceleration, constant speed, and the like) or longitudinal control and transverse control (left and right steering) on the vehicle to change a running status of the vehicle to stop the vehicle. This indicates that the vehicle reaches a minimum risk condition (Minimal Risk Condition, MRC). Specifically, an existing implementation solution of the minimum risk maneuver (MRM) mode depends on a specific component or a function failure of the vehicle. In this case, a corresponding result after minimum risk maneuver (MRM) is performed may be: The vehicle pulls over, the vehicle stops directly in an original lane, the vehicle stops in the original lane, or the vehicle stops in an adjacent lane.

FIG. 1(1) and FIG. 1(2) are schematic diagrams of a scenario of minimum risk maneuver of an automated vehicle in the conventional technology. A high-level automated driving system is controlling a vehicle to run in a curve of a road. As shown in FIG. 1(1), the vehicle has entered the curve. It is assumed that a steering mechanism of the vehicle is faulty (for example, insensitive in steering) at this moment, the vehicle is out of control of the automated driving system, and there is no response within a preset period of time after the system proposes a take over request to a driver. In this case, the system enters a minimum risk maneuver mode and performs deceleration control on the vehicle to stop the vehicle as soon as possible. A stopping position is P1 in FIG. 1(1) and is located in the curve. As shown in FIG. 1(2), a vehicle behind is about to enter the curve. However, because a field of view in the curve is limited, it is difficult for the vehicle behind near an entrance of the curve to make an accurate and timely judgment, and it is easy to cause accidents such as a rear-end collision between the vehicle behind and a vehicle stopped at P1 in the curve because the vehicle behind cannot respond in time due to low visibility and other reasons.

Figure 2:
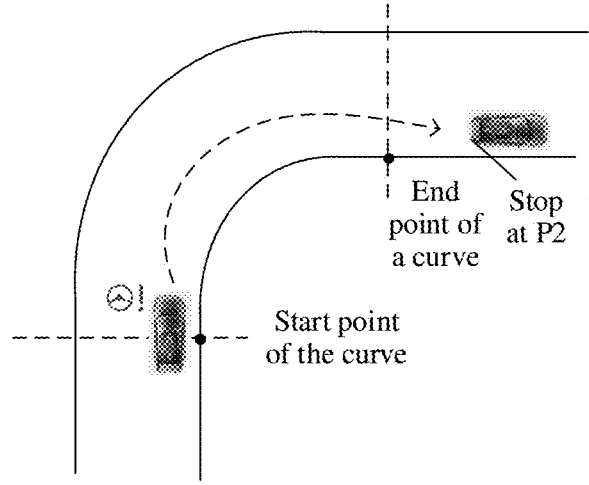
FIG. 2(1) to FIG. 2(3) are schematic diagrams of some scenarios of controlling an automated vehicle according to an embodiment of this application.
Figure 2:
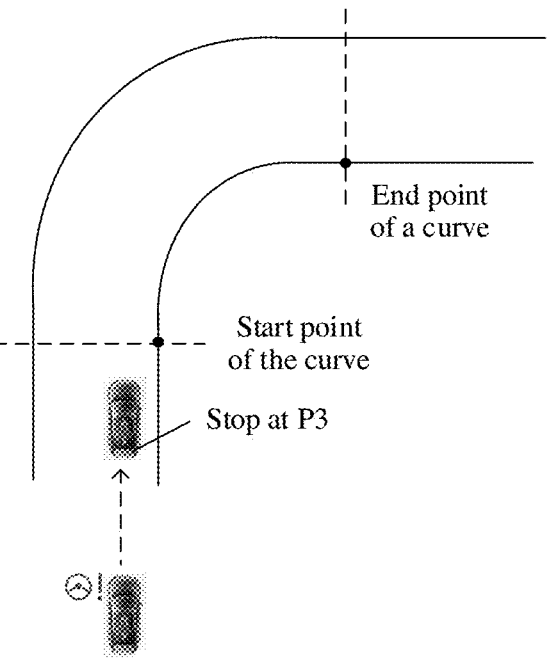
Figure 2:
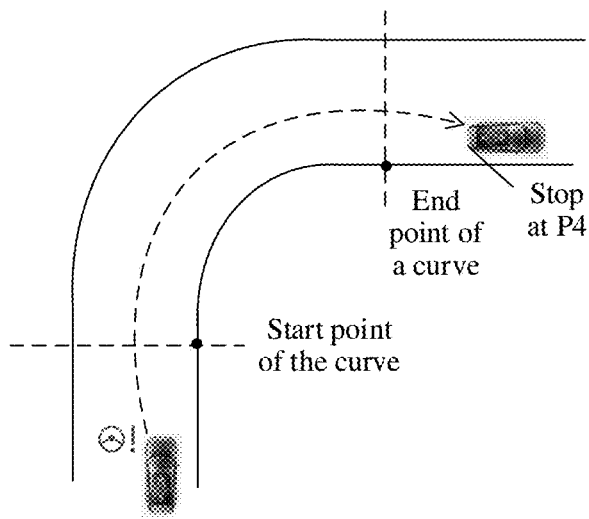

FIG. 2(1) to FIG. 2(3) are schematic diagrams of some scenarios of minimum risk maneuver of an automated vehicle according to an embodiment of this application. A high-level automated driving system is controlling a vehicle to run in a curve of a road. As shown in FIG. 2(1), the vehicle has entered the curve. It is assumed that a steering mechanism of the vehicle is faulty (for example, insensitive in steering) at this moment, the vehicle is out of control of the automated driving system, and there is no response within a preset period of time after the system submits a take over request to a driver. If the solution of this application is applied to a vehicle system, when the take over request is not responded, the vehicle can automatically take a related measure in time to enable the vehicle to leave the curve and stop at P2. A field of view of a vehicle behind entering the curve is not to be limited relative to this stopping position, so that the vehicle behind can make an avoidance response in time, and a rear-end collision accident in FIG. 1(2) is avoided. If the automated vehicle is about to enter the curve when a fault occurs and the vehicle is to be out of control of the automated driving system, and as shown in FIG. 2(2), if the solution of this application is applied to the vehicle system, the vehicle can automatically take a corresponding measure in time to stop at P3 before entering the curve. This stopping position does not exceed the start point of the curve, and provides a good field of view for the vehicle behind, so that the vehicle behind can make an avoidance response in time to avoid a rear-end collision accident. In addition, the solution of this application further provides another stopping solution. As shown in FIG. 2(3), the vehicle enters the curve and stops at P4 after exiting the curve. This stopping position provides a good field of view for the vehicle behind in the curve, so that the vehicle behind can make avoidance response in time to avoid a rear-end collision accident.

Figure 3:
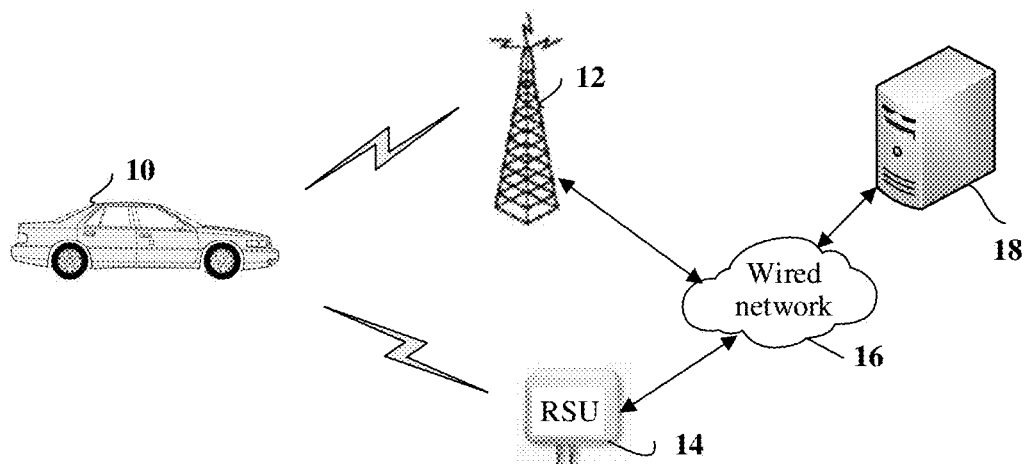
FIG. 3 is a diagram of a system architecture of a communications system of an automated vehicle according to an embodiment of this application.

The following describes a system architecture to which the embodiments of this application are applied. Refer to FIG. 3. FIG. 3 is an example of a diagram of a system architecture of a vehicle communications system. The communications system includes at least a vehicle 10, one or more wireless network devices 12, a road side unit (RSU) 14, a wired network 16, and a server 18. It should be understood that the disclosed method can be used together with any quantity of different systems, and is not specifically limited to an operating environment shown herein.

The vehicle 10 is a transport means equipped with a high-level automated driving system and a V2X communication function, and is mostly implemented in a form of a car or an automobile. Certainly, in some possible embodiments, the vehicle 10 may alternatively be another vehicle, for example, a truck, a sport utility vehicle, a bus, or a mountain scenic spot bus. The vehicle 10 has at least an information communications unit, a global positioning system (GPS) module, an audio system, a plurality of functional components, and the like. It should be noted that a plurality of devices in the vehicle may be directly connected to the information communications unit or indirectly connected to the information communications unit by using a communications bus or the like. The information communications unit not only transmits status information and control signals between electronic components in the vehicle on an intra-vehicle network, so that the vehicle can perform operations such as state sensing and fault diagnosis. In addition, the information communications unit may further transmit, on a network, information about the vehicle and a surrounding traffic environment and data information in a cloud, so that the vehicle can obtain a series of traffic information such as live traffic information, road information, and pedestrian information.

The wireless network device 12 may be a network device in a 2G, 3G, 4G, 5G, or future communications system, and includes a plurality of cell towers (only one is shown) and any other networking components for connecting the wireless network device 12 to the wired network 16. Each cell tower includes transmit and receive antennas and a base station. The wireless network device 12 may implement any appropriate communications technology, and various settings of cell towers/base stations are possible, and the cell towers/base stations may be used together with the wireless network device 12. For example, the base stations and cell towers can be co-located at a same place, or can be relatively far from each other. Each base station can respond to a single cell tower, or a single base station can serve all the cell towers. Only a few possible settings are enumerated herein.

The road side unit (RSU) 14 is mainly used in vehicle-to-infrastructure (V2I) communication, is a key device for implementing a smart road and a vehicle-to-infrastructure system, and includes a read-write antenna (RSU antenna) and a radio frequency controller (RSU controller). The road side unit (RSU) 14 is usually disposed on a road side, and performs bidirectional communication and data exchange with a nearby passing vehicle. Specifically, the road side unit (RSU) 14 may be connected to a road surface sensing monitoring device (for example, a traffic light, a camera, and a microwave radar) to collect road information and an abnormal condition on a road surface, such as pedestrian or animal intrusion, emergency lane parking, wrong-way driving, vehicle breakdown, a traffic accident, heavy fog, rock fall, or ice. The road side unit (RSU) 14 may further prestore parameter information of some adjacent roads, for example, a curvature radius, position coordinates of a start point, and position coordinates of an end point of a curve. In a specific implementation, the road side unit (RSU) 14 may further simply analyze information obtained by the road side unit to obtain information such as a vehicle flow rate. It can be learned that the road side unit (RSU) 14 may send all information obtained by the road side unit to the passing vehicle 10 in real time, or may upload the information to the server 18, so that the server 18 may send some road abnormal information to the vehicle 10 in advance.

The wired network 16 may be a conventional wired communications network that connects the wireless network device 12 and the road side unit 14 to the server 18. One or more portions of the wired network 16 can be implemented by using a standard wired network, an optical fiber or another optical network, a cable network, a power line, and any combination thereof.

The server 18 may be a service center computer, and diagnostic information and other driving data information of the vehicle 10 may be uploaded by using an information communications unit in the vehicle 10 through a wireless carrier communications system 12. A vehicle owner or another user may use the server 18 in the following manner: accessing or receiving vehicle data; setting or configuring user parameters; controlling functions of the vehicle; or accessing a third-party library, where the vehicle data or other information may be provided to or from the third-party library through communication with the vehicle 10 or the road side unit (RSU) 14, or through communication with the two. The server 18 can also be configured to provide an Internet connection, for example, a domain name server (DNS) service, or be used as a network address server that assigns an IP address to the vehicle 10 by using a dynamic host configuration protocol (DHCP) or another appropriate protocol.

It should be noted that the vehicle 10 may communicate with the road side unit (RSU) 14 and the server 18, in other words, the vehicle 10 may obtain related road information from the road side unit (RSU) 14 and the server 18 in a running process. In a possible embodiment, the vehicle 10 may further communicate with another vehicle (not shown in FIG. 3) on a road surface, to obtain information such as historical motion trail information and future motion trail information that are sent by another vehicle around. Based on the obtained information, the vehicle 10 assists itself in making intelligent control decisions during running.

Figure 4:
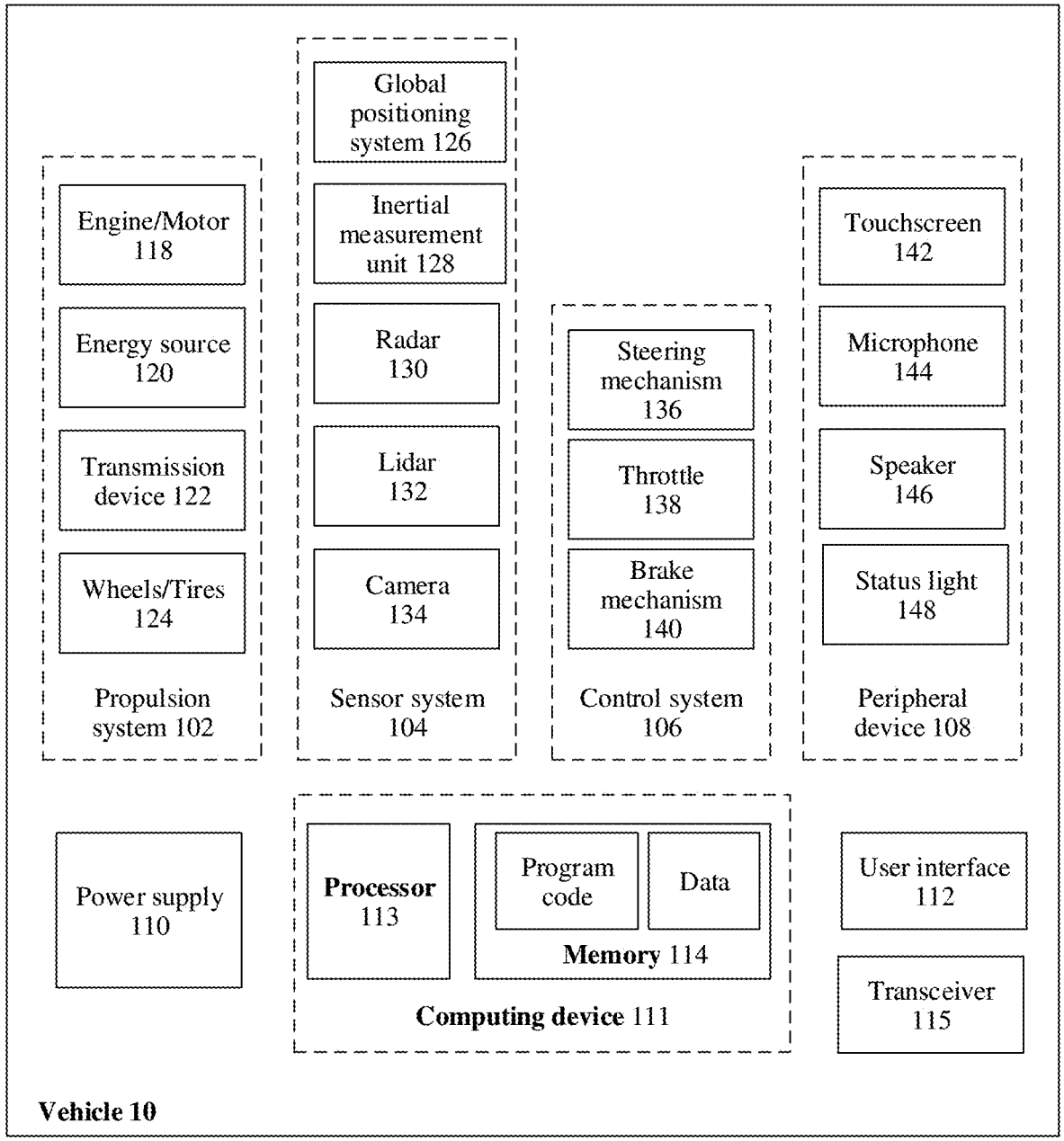
FIG. 4 is a schematic diagram of a structure of an automated vehicle according to an embodiment of this application.

Refer to FIG. 4. FIG. 4 is a schematic diagram of a structure of an example vehicle according to an embodiment of this application. Components coupled to a vehicle 10 or included in the vehicle 10 may include a propulsion system 102, a sensor system 104, a control system 106, a peripheral device 108, a power supply 110, a computing device 111, a transceiver 115, and a user interface 112. The computing device 11 further includes a processor 113 and a memory 114. The memory 114 may store data and program code that can be run by the processor 113. The components of the vehicle 10 may be configured to work in a manner of being interconnected to each other and/or being interconnected to other components coupled to various systems. For example, the power supply 11o may supply power to all the components of the vehicle 10. The computing device in may be configured to receive data from and control the propulsion system 102, the sensor system 104, the control system 106, and the peripheral device 108. In another example, the vehicle 10 may include more, fewer, or different systems, and each system may include more, fewer, or different components. In addition, the shown systems and components may be combined or split in any manner. This is not limited in this application. The components and systems of the vehicle 10 may be communicatively linked together through a system bus, a network, and/or another connection mechanism.

The propulsion system 102 is configured to power the vehicle 10. As shown in FIG. 4, the propulsion system 102 includes an engine/motor 118, an energy source 120, a transmission device 122, and wheels/tires 124.

The engine/motor 118 may be or include an internal combustion engine, an electric motor, a stirling engine, any combination of other motors and engines, or the like. In some examples, the propulsion system 102 in a gas-electric hybrid car may include a gasoline engine and an electric motor.

The energy source 120 may be fully or partially used to provide energy for the engine/motor 118, in other words, the energy source 120 may be converted to mechanical energy by the engine/motor 118. The energy source 120 may be gasoline, diesel, another petroleum-based fuel, propane, another compressed-gas-based fuel, anhydrous alcohol, a solar panel, a battery, or the like. In some examples, the energy source 120 may also provide energy for another system of the vehicle 10.

The transmission device 122 may be configured to transmit mechanical power from the engine/motor 118 to the wheels/tires 124. Therefore, the transmission device 122 may include a gearbox, a clutch, a differential, a drive shaft, and/or another element. The wheels/tires 124 may include any combination of metal and rubber, or a combination of other materials.

The sensor system 104 may include several sensors configured to sense information about an environment in which the vehicle 10 is located. As shown in the figure, the sensor system 104 includes a global positioning system (GPS) 126, an inertial measurement unit (IMU) 128, a radar 130, a lidar 132, and a camera 134. In a possible embodiment, the sensor system 104 may further include other sensors such as a sensor (for example, a fuel gauge, or an oil temperature) for monitoring an internal system of the vehicle 10.

The global positioning system (GPS) 126 is configured to position a geographical position of the vehicle 10, to obtain position coordinates of the vehicle 10 in real time. Data of the global positioning system may be used by the computing device 11 to determine, with reference to map data, a position relationship between a driving track of the vehicle 10 and an actual road.

The inertial measurement unit 128 is configured to sense changes in position and orientation of the vehicle 10 based on information such as inertial acceleration. In a possible embodiment, the inertial measurement unit 128 may include an accelerometer, a gyroscope, or another sensor.

The radar 130 detects, based on radio waves, properties of an object such as the height, direction, speed, and the like of the object. The lidar 132 detects an object or measures other information such as a distance to an object based on illumination, and includes components such as a light source (for example, laser light, ultraviolet light, infrared light, or visible light), a scanner, an optical system, an optical detector, and a receiver electronic device.

The camera 134 may be any camera configured to obtain an image of an environment in which the vehicle 10 is located. For example, an infrared camera may be configured to monitor a pedestrian, an animal, and the like at night, a visual camera may be configured to monitor a blind spot, assist parking, and the like, and a 3D camera may be configured to monitor driving, perform field detection, and the like.

The sensor system 104 may additionally or alternatively include a component other than the shown components.

The control system 106 is used to control a motion state of the vehicle 10. The control system 106 may include a steering mechanism 136, a throttle 138, and a brake mechanism 140. The steering mechanism 136 is configured to control an advancing direction of the vehicle by adjusting left and right steering of the vehicle 10. The throttle 138 is configured to control an operation speed and acceleration of the engine/motor 118, to further control a driving speed of the vehicle 10. The brake mechanism 140 is configured to decelerate the vehicle 10. In an example, the brake mechanism 140 may decelerate the vehicle by increasing friction between the wheels/tires 124 and the ground.

It should be noted that the computing device 11 analyzes an individual object and/or a feature, for example, lane information, a traffic signal, and a detected obstacle, in an environment based on data of each sensor in the sensor system 104, and delivers a corresponding instruction, for example, obstacle avoidance, route change, turning, or the like to the control system 106 based on an analysis result. The control system 106 controls, according to received instruction information, corresponding hardware to turn left and right and/or accelerate and decelerate to implement operations such as turning and obstacle avoidance.

The peripheral device 108 may be configured to allow the vehicle 10 to interact with an external sensor, another vehicle, and/or a user. Therefore, the peripheral device 108 may include, for example, a transceiver 115, a touchscreen 142, a microphone 144, a speaker 146, and/or a warning light 148.

The transceiver 115 may include an antenna and a chipset for communicating with another vehicle, a road side unit, a sensor, or another entity directly or through an air interface. The transceiver 115 may be configured to receive and transmit information according to one or more other types of wireless communications (for example, protocols), such as Bluetooth, IEEE 802.11 communications protocols, a cellular technology, worldwide interoperability for microwave access (WiMAX) or long term evolution (LTE), a ZigBee protocol, dedicated short range communications (DSRC), radio frequency identification (RFID) communications, and the like.

The touchscreen 142 may be used by the user to enter a command to the vehicle 10. The touchscreen 142 may include one or more translucent or transparent insulating layers and one or more translucent or transparent conducting layers. The microphone 144 may be configured to receive audio (for example, a voice command or another audio input) from the user of the vehicle 10. Similarly, the speaker 146 may be configured to output audio to the user of the vehicle 10.

The status light 150 may be configured to represent a status of the vehicle in running. The status light 150 includes at least an LED light, a halogen light, a HID xenon light, a HID lamp, a turn light, a width lamp, a fog light, a signal light, and the like. In another embodiment, the status light 150 may be further configured to prompt a function status of each component in the vehicle to a vehicle owner, and includes a safety belt reminder light, an engine emissions warning light, an engine oil indicator, and the like.

The peripheral device 108 may additionally or alternatively include a component other than the shown components.

The power supply 110 is configured to provide power to some or all of the components of the vehicle 10, and may be a rechargeable lithium-ion or lead-acid battery. The user interface 112 is configured for a user to input information into the vehicle 10, to implement interaction with the vehicle.

The processor 113 included in the computing device 11 may include one or more general-purpose processors and/or one or more dedicated processors (for example, an image processor and a digital signal processor). The memory 114 in the computing device 11 may include one or more volatile storage components and/or one or more non-volatile storage components, such as an optical storage apparatus, a magnetic storage apparatus, and/or an organic storage apparatus. In addition, the memory 114 may be integrated with the processor 113 in whole or in part. The memory 114 may be configured to store program code and data, where the stored program code includes a sensor fusion algorithm, a target detection algorithm, a structure from motion algorithm, a target tracking algorithm, and the like. The stored data includes map data, detection data of each sensor in the vehicle, and road information data (for example, a curvature radius of a curve, position coordinates of a start point, and position coordinates of an end point) sent by the road side unit (RSU), user input information received by the user interface, and the like.

In this application, the processor 113 is configured to invoke the program code and the data in the memory 114 to perform the method described in the following embodiment.

Figure 5:
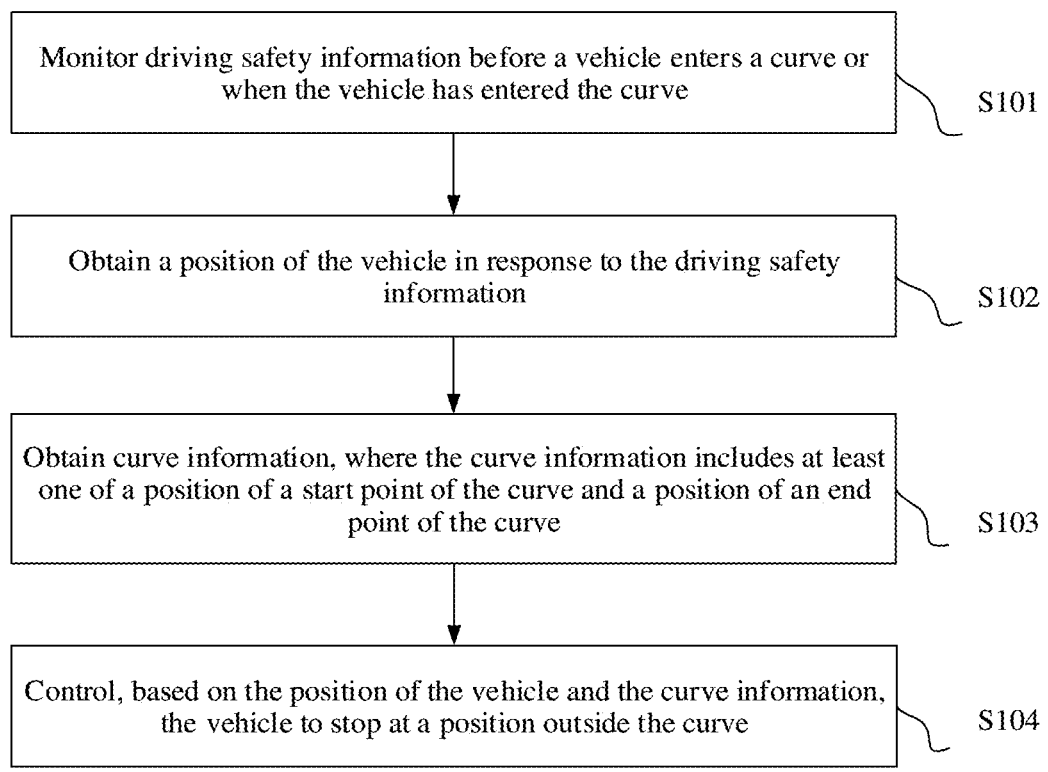
FIG. 5 is a flowchart of a method for controlling an automated vehicle according to an embodiment of this application.

Based on the foregoing description, refer to FIG. 5. The following describes a method for controlling an automated vehicle according to an embodiment of this application. The method includes but is not limited to the following steps.

S101: Monitor driving safety information before a vehicle enters a curve or when the vehicle has entered the curve.

In this embodiment of this application, before the vehicle enters the curve or when the vehicle has entered the curve, the vehicle in an automated driving state detects the driving safety information, and the driving safety information affects driving safety of the vehicle. Therefore, after the driving safety information is monitored, a vehicle system automatically exits the automated driving state and enters a minimum risk maneuver mode or proposes a take over request for exiting an automated driving system and driving the vehicle by a driver. If the system does not receive a response from the driver within a preset period of time after the system proposes the take over request, the system enters the minimum risk maneuver mode by default and performs subsequent operations on the vehicle to ensure that the vehicle reaches a minimum risk condition.

It can be learned that many random events may occur during automated driving of the vehicle. For example, twigs of a tree beside a road hit a front cover of the vehicle, it is prompted that a wiper is faulty when the vehicle runs on a sunny day, and it is prompted that a rainfall sensor is faulty when the vehicle runs on a sunny day. It is easy to know that these events are not urgent or dangerous for the vehicle in corresponding scenarios of these events to exit the automated driving state and stop immediately. Therefore, none of these events belongs to the driving safety information in this application. It should be noted that the driving safety information in this application is information that affects driving safety of the vehicle or causes the vehicle to exit the automated driving state and then stop.

For example, the driving safety information may be system fault information of the vehicle, and the system fault information indicates that a fault occurs in the vehicle. On one hand, the driving safety information may be fault information of a sensor of the vehicle. For example, a side-rear sensor of the vehicle prompts a fault. As a result, the system cannot detect and respond to a situation of a rear adjacent lane, and then cannot perform control such as lane change. Certainly, in some possible embodiments, an ultrasonic sensor for obstacle detection, a dead reckoning sensor for distance measurement, or the like may fail. On the other hand, the driving safety information may alternatively be fault information of a steering mechanism or a brake mechanism of the vehicle. For example, the steering mechanism prompts a fault that causes a steering angle set by the system is inconsistent with an actual steering angle of the vehicle when the system performs left and right steering control on the vehicle. This affects driving safety of the vehicle during automated driving.

For example, the driving safety information may alternatively be environmental risk information. The environmental risk information indicates that a driving environment of the vehicle does not meet a risk range preset in the automated driving system, in other words, a parameter of an environment in which the vehicle is currently located exceeds an operational design domain (ODD) of the vehicle in the automated driving state. For example, environmental parameters such as rainfall, snowfall, heavy fog density, or road section information in a current driving environment do not meet the operational design domain (ODD). In this case, the vehicle exits the automated driving state.

For example, the driving safety information may alternatively be curve obstacle information, and the curve obstacle information indicates that there is an obstacle blocking traffic in the curve. For example, the driving safety information may be a received event in which a road is occupied because a vehicle collision accident occurs in a curve section ahead, or a curve is blocked by a large rock or a tree branch due to a natural disaster such as a landslide, a typhoon, or an earthquake. In this case, the vehicle is forced to stop at an entrance of the curve and cannot enter the curve.

It should be noted that monitoring the driving safety information may be implemented by the vehicle through detection, or may be implemented by receiving information sent by a road side unit or a cloud server.

S102: Obtain a position of the vehicle in response to the driving safety information.

In this embodiment of this application, the position of the vehicle is obtained in response to the monitored driving safety information.

For example, the position of the vehicle may be obtained by using a global positioning system (GPS), an assisted global positioning system (AGPS), a Mapbar positioning system (MPS), a BeiDou satellite positioning system, a global navigation satellite system (GLONASS), or a Galileo satellite positioning system in the vehicle.

For example, if a positioning system sensor of the vehicle fails, the position of the vehicle may be determined based on an image that is shot by a calibrated camera in the vehicle and that includes a vehicle body and a peripheral reference object (a road boundary line, a road surface traffic sign line, a landmark building, or the like) with reference to a calibration parameter of the camera and with reference to position coordinates of the peripheral reference object that are provided in map data.

In a possible embodiment, the position of the vehicle may alternatively be detected by the road side unit (RSU), and the position of the vehicle is sent to a corresponding target vehicle. It should be noted that a manner of obtaining the position of the vehicle is not specifically limited in this application.

S103: Obtain curve information, where the curve information includes at least one of a position of a start point of the curve and a position of an end point of the curve.

In this embodiment of this application, the curve information further needs to be obtained. The curve information includes at least one of the position of the start point of the curve and the position of the end point of the curve. It should be noted that the position of the start point of the curve and the position of the end point of the curve are determined based on a direction in which the vehicle enters the curve. For example, it is assumed that AB represents a curve, and a running direction of a vehicle is from A to B. In this case, for this vehicle, A is a position of a start point of the curve, and B is a position of an end point of the curve.

The curve in this embodiment of this application is a road section that is of a highway, a first-class road, a second-class road, a third-class road, or a fourth-class road and whose curvature radius is less than or equal to 800 meters.

For example, the curve information obtained by the vehicle may be corresponding curve information sent to the vehicle by the road side unit beside a target curve when the vehicle approaches the target curve. The curve information may be sent in a unicast, multicast, or broadcast manner. This is not specifically limited in this application.

For example, a manner of obtaining the curve information by the vehicle may alternatively be that the vehicle detects, by using the global positioning system (GPS) or the assisted global positioning system (AGPS), or the Mapbar positioning system (MPS), that there is a curve ahead, and obtains corresponding curve information from the map data.

In a possible embodiment, the curve information obtained by the vehicle may alternatively be sent by the cloud server. It should be noted that the manner of obtaining the curve information is not specifically limited in this application.

S104: Control, based on the position of the vehicle and the curve information, the vehicle to stop at a position outside the curve.

In this embodiment of this application, the vehicle performs longitudinal control (acceleration, deceleration, constant speed, and the like) or performs transverse control (left and right steering) and longitudinal control (acceleration, deceleration, constant speed, and the like) on the vehicle based on the obtained position of the vehicle and the curve information, to change a motion state of the vehicle to ensure that the vehicle reaches a minimum risk condition, and finally the vehicle is controlled to stop at the position outside the curve, for example, stop before entering the curve or after passing through the curve.

It should be noted that the position outside the curve may be a position some distance from the start point of the curve, or may be a position some distance from the end point of the curve. The vehicle stopping at this position can be easily noticed by a vehicle behind, in other words, the vehicle is in a field of view of the vehicle behind, and the vehicle behind has sufficient reaction time to take a measure for avoidance to avoid a collision.

It should be noted that, after the vehicle is controlled to stop at the position outside the curve, optionally, the vehicle may be further controlled to perform at least one of the following measures: turning on hazard warning signal lights to perform danger signal alerting; controlling the vehicle to start an automatic shutdown instruction to shut down an engine; indicating a door to be automatically unlocked when the door is locked, to facilitate rescue personnel to perform rescue; and indicating the vehicle to activate an emergency rescue system.

It can be learned that the driving safety information is monitored in real time, so that when the vehicle detects the driving safety information near or in the curve, the vehicle controls the vehicle based on a current vehicle position and the curve information, for example, controls the vehicle to brake, shift gears, slow down, or change lanes, to ensure that the vehicle finally stops at the position outside the curve. Because a road outside the curve is usually a straight road and there are few driving blind spots, it is ensured that the vehicle behind has a sufficiently good field of view and a sufficiently long reaction time to take an avoidance measure in time, so that a rear-end collision accident caused by stopping in the curve is avoided, and driving safety of the vehicle is improved.

Figure 6:
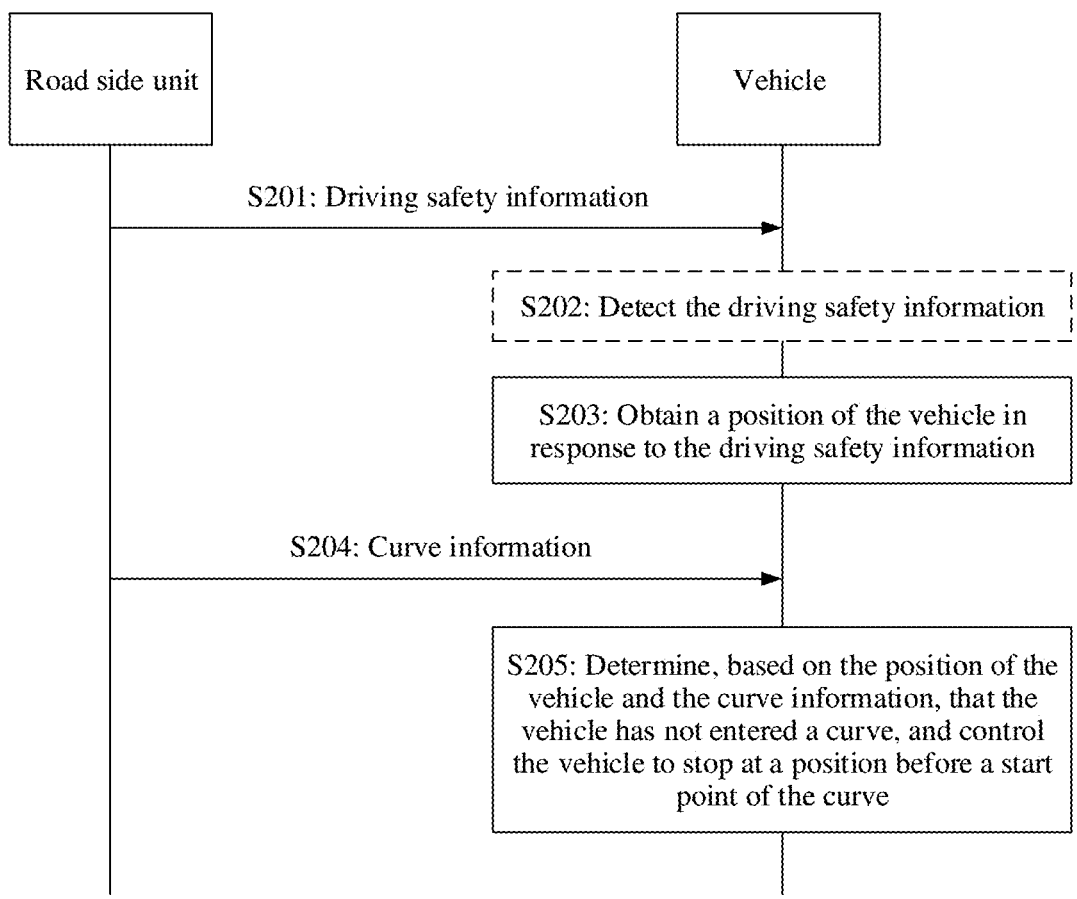
FIG. 6 is a flowchart of a method for controlling an automated vehicle before the automated vehicle enters a curve according to an embodiment of this application.

Refer to FIG. 6. The following describes a method for controlling an automated vehicle before the automated vehicle enters a curve according to an embodiment of this application, to describe a possible implementation scenario of a solution when the vehicle has not entered the curve. The method includes but is not limited to the following steps.

S201: Optionally, a road side unit sends driving safety information to the vehicle.

Specifically, the road side unit detects the driving safety information in the curve through a road surface detection sensing device connected to the road side unit, and sends the driving safety information to the vehicle. The information may be sent in a unicast, multicast, or broadcast manner. It can be learned that the driving safety information sent by the road side unit to the vehicle may be curve obstacle information, and the curve obstacle information indicates that there is an obstacle blocking traffic in the curve. For example, the monitored driving safety information is that a multiple-vehicle collision accident occurs in the curve, a large stone or a big tree lies across the curve due to a rainstorm, a typhoon, or the like, or a road surface of the curve is broken due to an earthquake. The monitored driving safety information is used to remind a vehicle behind that the current curve is blocked or dangerous, and not to enter the curve.

S202: Optionally, the vehicle detects the driving safety information.

Specifically, the vehicle detects the driving safety information related to the vehicle by using software or hardware, for example, a sensor or a software system of the vehicle. In a specific implementation, the driving safety information may be system fault information of the vehicle, and indicates that a fault occurs in the vehicle. For example, hardware, for example, a side-rear sensor of the vehicle (configured to detect a vehicle behind), a steering mechanism (configured to perform left and right steering), a dead reckoning sensor (configured to perform distance measurement) is faulty. In another specific implementation, the driving safety information may be environmental risk information, to be specific, the vehicle detects that a current driving environment (a climate condition, a road section type, or the like) does not meet an operation range set by an automated driving system of the vehicle. For example, rainfall in the current driving environment obtained by a rainfall sensor of the vehicle exceeds a rainfall threshold preset in the automated driving system.

It should be noted that, in a specific implementation, step S201 may be replaced with step S202, in other words, either step S201 or step S202 is performed.

S203: The vehicle obtains a position of the vehicle in response to the driving safety information. For a specific implementation of this step, refer to related descriptions in S102 in the embodiment of FIG. 5. Details are not described herein again.

S204: The road side unit sends curve information to the vehicle.

Specifically, the road side unit (RSU) prestores parameter information related to the curve, such as a position of a start point of the curve, a position of an end point of the curve, and a curvature radius of the curve. When the road side unit detects, by using a camera connected to a road side, that a vehicle is about to enter the curve, the road side unit sends the curve information (including at least one of the position of the start point of the curve and the position of the end point of the curve) to the vehicle. Certainly, in some possible embodiments, the curve information may be directly provided by map data in the vehicle or obtained by processing the map data in the vehicle, or may be sent by a cloud server. The curve information may alternatively be obtained by receiving a motion trail that includes the curve information and that is sent, based on vehicle-to-vehicle communication, by another normally running vehicle in the curve, and the curve information is obtained from the obtained motion trail.

It should be noted that, in step S201 and step S203, the road side unit (RSU) may send corresponding information to the vehicle in twice, or all information may be sent to the vehicle once in step S201, in other words, the driving safety information and the curve information are sent to the vehicle together in step S201. This is not specifically limited in this application.

S205: Determine, based on the position of the vehicle and the curve information, that the vehicle has not entered the curve, and control the vehicle to stop at a position before the start point of the curve.

Specifically, a relative position relationship between the vehicle and the curve may be determined by comparing the position of the vehicle with the position of the start point of the curve and the position of the end point of the curve that are in the curve information. The relative position relationship includes that the vehicle is in the curve and that the vehicle is outside the curve. When the relative position relationship is that the vehicle is outside the curve, and the vehicle is approaching the position of the start point of the curve, it may be determined that the vehicle has not entered the curve. In this case, a distance between the vehicle and the position of the start point of the curve is calculated, a braking force threshold for the vehicle to stop (in other words, a speed of the vehicle is zero) at the position of the start point of the curve may be calculated based on a real-time speed of the vehicle, and then a brake mechanism of the vehicle is controlled to provide a braking force greater than or equal to the braking force threshold to change a motion state of the vehicle, to ensure that the vehicle stops at a position before the start point of the curve.

In another embodiment of this application, before the vehicle enters the curve (in other words, when the vehicle runs towards the start point of the curve), if the vehicle detects, by using hardware such as a camera in the vehicle, that a vehicle is parked before the start point of the curve, a position of the parked vehicle before the start point of the curve is obtained, a distance between the position of the vehicle and the position of the parked vehicle is calculated, a minimum braking force for the vehicle to stop before the position of the parked vehicle is calculated based on the real-time speed of the vehicle, and finally, the brake mechanism of the vehicle is controlled to provide corresponding braking force to quickly decelerate the vehicle, to ensure that the vehicle stops before the position of the parked vehicle when there is the parked vehicle before the start point of the curve, to avoid collision with the parked vehicle. It should be noted that the position, obtained by the vehicle, of the parked vehicle before the start point of the curve may alternatively be a stopping position that is sent by the road side unit or that is received from the parked vehicle and that is broadcast by the parked vehicle based on vehicle-to-vehicle communication.

In another embodiment of this application, when the driving safety information detected before the vehicle enters the curve is the system fault information or the environmental risk information in step S101, the curve information that is sent by the road side unit and that is received by the vehicle further includes the curvature radius of the curve. The vehicle can obtain a corresponding safety speed and a corresponding safe stopping distance (namely, a first safety distance in the following embodiment in FIG. 8) based on the curvature radius of the curve. Finally, the vehicle is controlled to enter the curve at the safety speed and stop at a position that is the safe stopping distance from the end point of the curve after the vehicle exits the curve.

It should be noted that the safe stopping distance and the safety speed may be obtained by the vehicle through calculation based on the obtained curvature radius, or may be sent by the road side unit or the cloud server, or may be obtained by searching based on mapping information between a curvature radius, a safety speed, and a safe stopping distance that are prestored in the vehicle. The mapping information may be similar to a mapping relationship table shown by Table 1. As shown in Table 1, a specific numeric value in the table may be predefined in the vehicle by a vehicle manufacturer or a system provider, or may be predefined in the road side unit and sent to the vehicle. Although the numeric values in Table 1 are not specifically limited in this embodiment of this application, it can be learned that a larger curvature radius of the curve indicates a higher corresponding safety speed and a longer safe stopping distance.

It should be noted that, in a specific implementation, a specific stopping position of the vehicle before the start point of the curve may be further determined with reference to traffic regulations for a curve section.

It can be learned that, in this embodiment of this application, when the vehicle detects, before entering the curve, the driving safety information that affects normal running of the vehicle, the vehicle is controlled, with reference to the position of the vehicle and the curve information sent by the road side unit, to stop before entering the curve, that is, to stop before the position of the start point of the curve. Alternatively, the vehicle is controlled to safely pass the curve and then stop, that is, stop after the position of the end point of the curve. By implementing this embodiment of this application, the vehicle can be stopped outside the curve. Because a road after the curve is usually a straight road, and there are fewer driving blind spots, it is ensured that a vehicle behind can take an avoidance measure in time. This avoids a rear-end collision accident between vehicles.

TABLE 1

| Curvature radius (m) | 60 | 125 | 250 | 400 | 500 | 600 | ... |
|---|---|---|---|---|---|---|---|
| Corresponding safety speed (m/s) | XX | XX | XX | XX | XX | XX | ... |
| Safe stopping distance (m) | XX | XX | XX | XX | XX | XX | ... |

Figure 7:
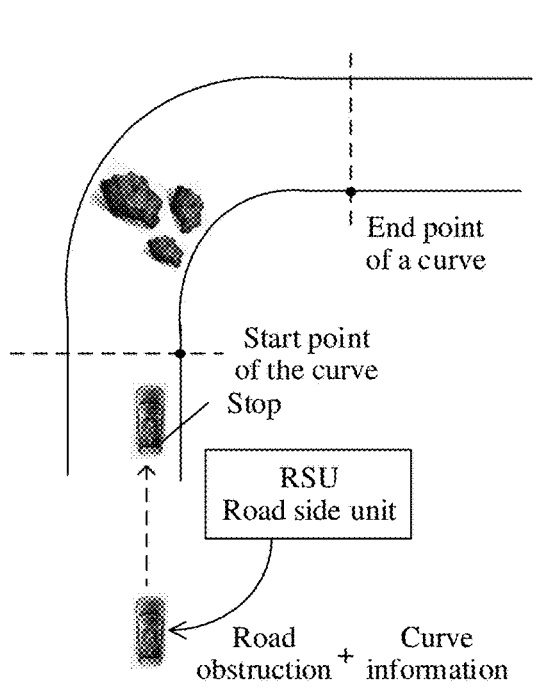
FIG. 7(1) to FIG. 7(4) are a schematic diagram of some scenarios before an automated vehicle enters a curve according to an embodiment of this application.
Figure 7:
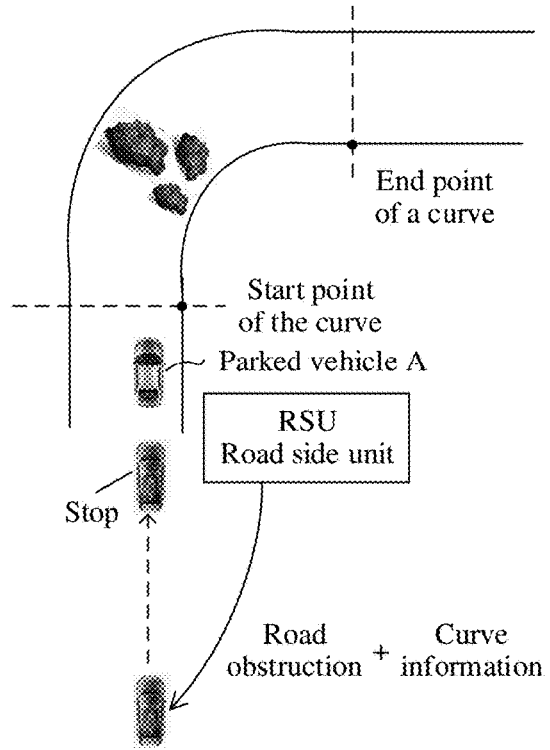
Figure 7:
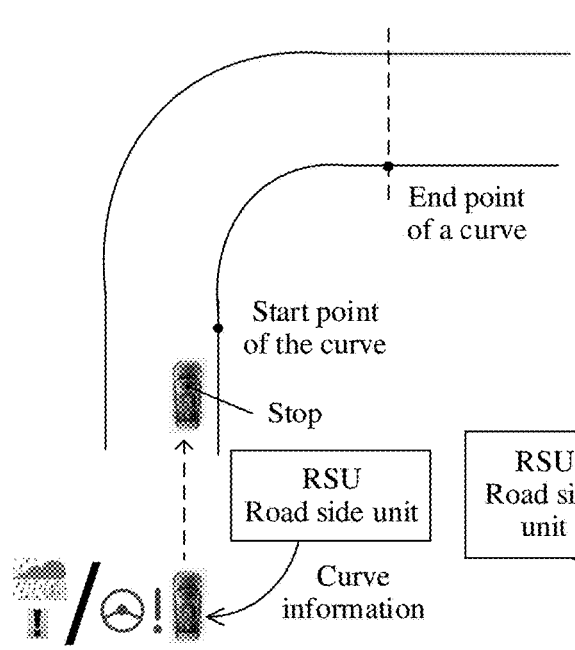
Figure 7:
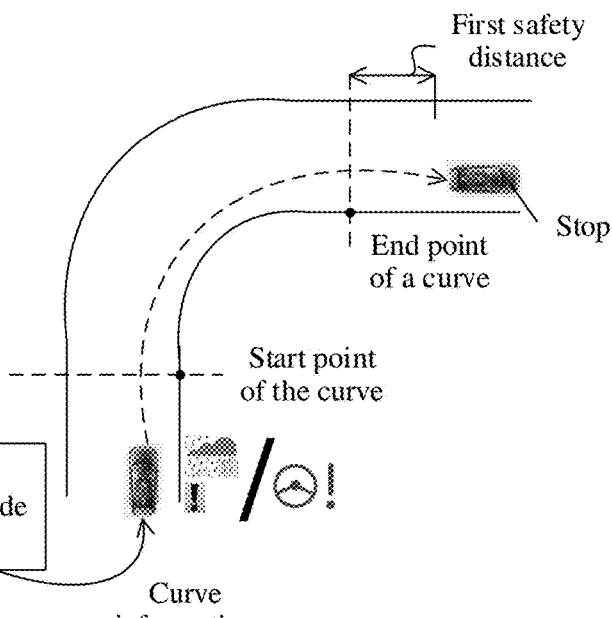

Refer to FIG. 7(1) to FIG. 7(4). The following describes the method in the embodiment of FIG. 6 by using some specific application scenarios. As shown in FIG. 7(1), before entering a curve, a vehicle receives road obstruction information sent by a road side unit (RSU). For example, a large stone occupies a road in the curve to block traffic. The vehicle further receives position coordinates that are of a start point of the curve and that are sent by the road side unit (RSU). The vehicle is controlled to decelerate based on a distance between the vehicle and the start point of the curve, to ensure that the vehicle stops in time before entering the curve, that is, stops before the start point of the curve. As shown in FIG. 7(2), it is assumed that before entering the curve, the vehicle receives the road obstruction information sent by the road side unit (RSU). For example, a large stone occupies a road in the curve to block traffic. In a deceleration process, if the vehicle detects that there is a parked vehicle A before the start point of the curve, the vehicle controls the vehicle to decelerate based on a distance between the vehicle and a position of the detected parked vehicle, to ensure that the vehicle stops behind the parked vehicle A. In some possible application scenarios, the road obstruction information that is received by the vehicle and sent by the road side unit (RSU) may alternatively be that vehicles in the curve collide and occupy a road (not shown in FIG. 7(1) to FIG. 7(4)), that a tree collapses due to a natural disaster and occupies the curve (not shown in FIG. 7(1) to FIG. 7(4)), or the like.

In another scenario of this application, as shown in FIG. 7(3), before entering the curve, the vehicle detects that a sensor of the vehicle is faulty. For example, a steering function of a steering mechanism is insensitive, to be specific, a set rotation angle of a steering wheel and an actual steering angle of the vehicle do not meet a preset relationship; or a side-rear sensor of the vehicle is faulty, which makes it impossible to detect the traffic behind the vehicle; or if a rainfall sensor of the vehicle detects that rainfall in a current driving environment exceeds a rainfall threshold preset in an automated driving system, the system gives an environmental risk warning. After detecting the driving safety information (including system fault information and environmental risk information), the vehicle may automatically control the vehicle to decelerate to ensure that the vehicle stops before the start point of the curve.

In another scenario of this application, as shown in FIG. 7(4), before entering the curve, the vehicle detects that the steering mechanism is insensitive or an environmental parameter (for example, rainfall) in the current driving environment is not consistent with a driving environment parameter preset in the automated driving system. The vehicle receives curve information sent by the road side unit (RSU), obtains a safety speed and a first safety distance based on the curve information, and controls the vehicle to enter the curve at the safety speed and stop at the first safety distance from an end point of the curve.

Figure 8:
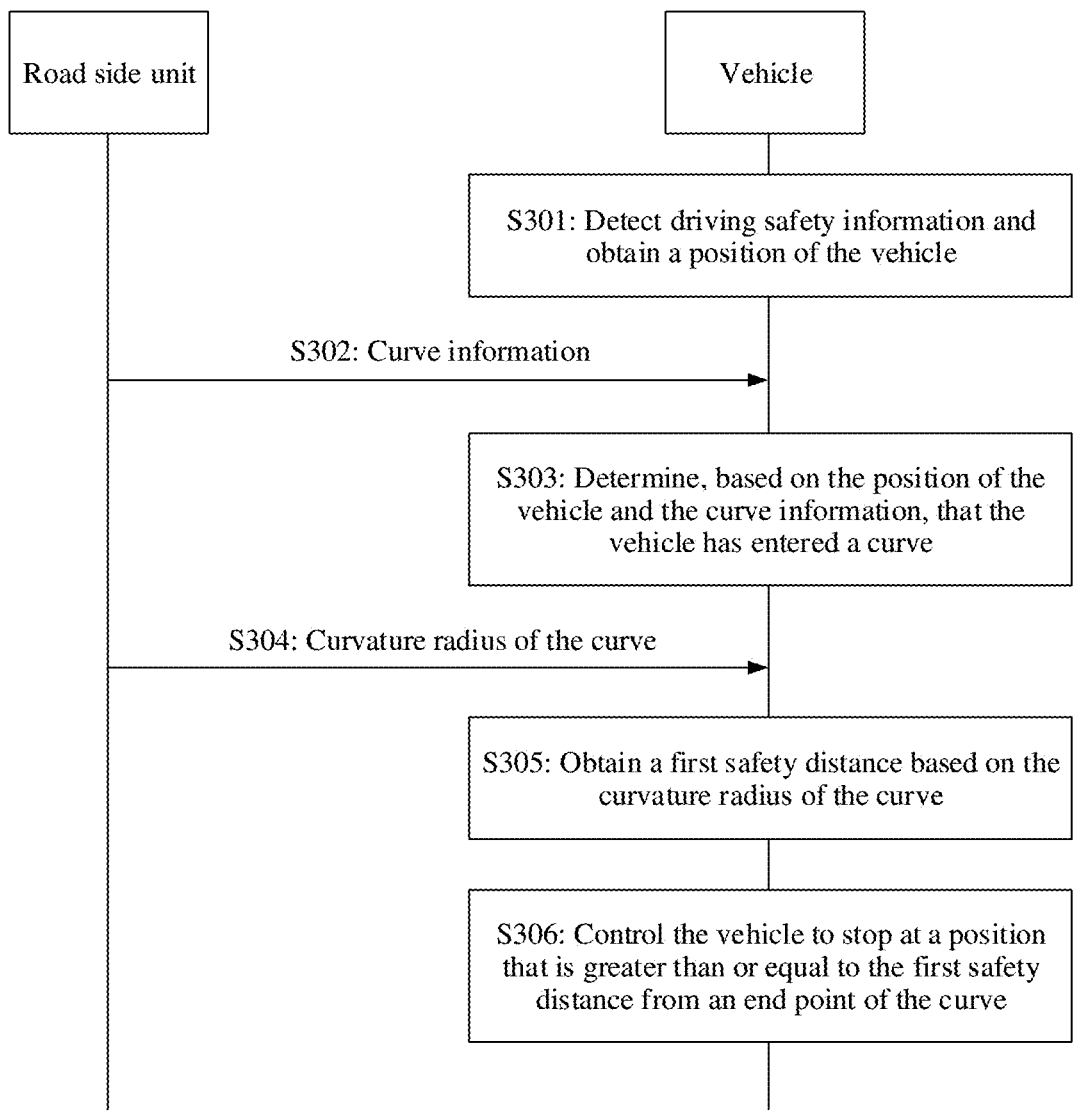
FIG. 8 is a flowchart of a method for controlling an automated vehicle after the automated vehicle enters a curve according to an embodiment of this application.

Refer to FIG. 8. The following describes a method for controlling an automated vehicle after the automated vehicle enters a curve according to an embodiment of this application, to describe a possible implementation scenario of a solution when the vehicle has entered the curve. The method includes but is not limited to the following steps.

S301: The vehicle detects driving safety information and obtains a position of the vehicle. For a specific implementation of this step, refer to related descriptions of step S202 and step S203 in the embodiment of FIG. 6. Details are not described herein again.

S302: A road side unit sends curve information to the vehicle. For a specific implementation of this step, refer to related descriptions of step S204 in the embodiment of FIG. 6. Details are not described herein again.

S303: The vehicle determines, based on the position of the vehicle and the curve information, that the vehicle has entered the curve.

Specifically, a relative position relationship between the vehicle and the curve may be determined by comparing the position of the vehicle with a position of a start point of the curve and a position of an end point of the curve that are in the curve information. If the relative position relationship indicates that the vehicle is in the curve, the vehicle has entered the curve.

It should be noted that the relative position relationship between the vehicle and the curve may be determined based on the position of the vehicle and position coordinates of the start point and the end point of the curve. To be specific, if thresholds of a distance between the vehicle and the start point and a distance between the vehicle and the end point are within a specific range and the position of the vehicle is between the position coordinates of the start point and the end point of the curve, it may be determined that the vehicle is in the curve. In another embodiment of this application, it may also be determined, by using a navigation system in the vehicle, that the vehicle has entered the curve.

S304: The road side unit sends a curvature radius of the curve to the vehicle.

Specifically, the road side unit prestores the curvature radius of the curve, and may send the curvature radius of the curve to passing vehicles to assist the vehicles in driving. It can be learned that the curve is an area where traffic accidents frequently occur. In a curve section, vehicles often sideslip, roll over, or the like because of excessively high speeds, and have rear-end collision accidents and the like due to blocked lines of sight. However, the curvature radius of the curve is closely related to a safety driving speed of the vehicle. After learning the curvature radius of the curve, the vehicle may adjust its own driving speed in the curve in time, to ensure safe driving of the vehicle.

A common curvature radius of the curve can be 60 m, 125 m, 250 m, 400 m, 500 m, 600 m, or another value. A specific parameter is determined by an actual curve.

It should be noted that, in step S304 and step S302, the road side unit (RSU) may send corresponding information to the vehicle in twice, or all information may be sent to the vehicle once in step S302, in other words, the position of the start point, the position of the end point, and the curvature radius of the curve are sent to the vehicle together in step S202. This is not specifically limited in this application.

S305: Obtain a first safety distance based on the curvature radius of the curve.

Specifically, the vehicle first obtains a safety speed of the vehicle under this radius of the curve based on the curvature radius of the curve, and determines a safe stopping distance after the curve based on the obtained safety speed and the curvature radius of the curve. The safe stopping distance is also referred to as the first safety distance in this application.

It should be noted that the first safety distance is used to prevent a vehicle behind in the curve from colliding with a stopped vehicle at the end point of the curve because the vehicle behind cannot respond immediately due to a limited field of view. To be specific, relative to a positive extreme distance of the vehicle behind, the first safety distance is a maximum braking distance determined by considering factors such as a speed of the vehicle behind, a reaction time for detecting a parked vehicle in front, and a braking force of the vehicle behind. In other words, when a stopping position of a target vehicle is greater than or equal to the first safety distance, the target vehicle does not collide with the vehicle behind even if the vehicle behind in the curve finds that there is the target vehicle stopped at the end point of the curve when the vehicle behind is about to exit the curve.

It may be learned that when the vehicle runs in the curve, if the curvature radius of the curve is excessively small or the driving speed of the vehicle is excessively high, a vehicle body is prone to side-slipping or rollover. To ensure driving safety, the speed of the vehicle needs to be controlled when the vehicle enters the curve. Therefore, it is useful to calculate a relationship between the curvature radius (or referred to as a turning radius) of the curve and the safety speed of the vehicle. Specifically, a maximum speed of the vehicle when the vehicle turns under different curvature radiuses of the curve or a minimum turning radius allowed by different speeds may be calculated according to the d'Alembert principle. Further, when the curvature radius and the safety speed corresponding to the vehicle are determined, the safe stopping distance after the vehicle leaves the curve is calculated, to obtain a correspondence between the curvature radius of the curve, the safety speed of the vehicle, and the safe stopping distance of the vehicle. It can be learned that the correspondence may be prestored in the vehicle by an automobile manufacturer, or may be sent by the road side unit to the vehicle, or may be calculated by the vehicle based on information obtained in real time.

It should be noted that the first safety distance may be predefined and stored in a memory of the vehicle by the automobile manufacturer with reference to information such as a vehicle model parameter and the curvature radius of the curve when the vehicle is at delivery, or may be a recommended value prestored in the road side unit (RSU) beside the curve, or may be obtained by an automated driving system of the vehicle through calculation based on related information obtained in real time. A manner in which the vehicle obtains the first safety distance is not limited in this application.

For example, the safety speed of the vehicle corresponding to the curvature radius of the curve may be determined in the following manner. The safety speed herein is a maximum speed at which the vehicle is allowed to run in the curve when the curvature radius of the curve is determined. In a specific implementation, the safety speed corresponding to the vehicle is determined when the vehicle reaches a sideslip critical state. It is assumed that the vehicle travels at a constant speed in the curve, the speed is v, a mass of the vehicle is m, a gravity acceleration is g, a friction coefficient between tires and a ground is μ, a turning radius of the vehicle (namely, the curvature radius of the curve) is r, and $$\mu mg = m\frac{v^2}{r}$$

may be obtained based on force balance of the vehicle. Therefore, the safety speed v corresponding to the vehicle is $\sqrt{\mu gr}$ when the curvature radius of the curve is r. In another specific implementation, the safety speed corresponding to the vehicle is determined when the vehicle reaches a rollover critical state. It is assumed that the vehicle travels at a constant speed in the curve, the speed is v, the mass of the vehicle is m, a wheelbase is b, a height of a center of mass is h, the friction coefficient between the tires and the ground is μ, the turning radius of the vehicle (namely, the curvature radius of the curve) is r, and $$mg\frac{b}{2h} = m\frac{v^2}{r}$$

may be obtained based on force balance of the vehicle. Therefore, the safety speed v corresponding to the vehicle is $$\sqrt{\frac{gbr}{2h}}$$

when the curvature radius of the curve is r. In addition, in a possible embodiment, the safety driving speed of the vehicle may be further determined with reference to speeds when the vehicle sideslips and rolls over.

S306: Control the vehicle to stop at a position that is greater than or equal to the first safety distance from the end point of the curve.

Specifically, the vehicle controls, based on the first safety distance and the corresponding safety speed that are obtained in step S305, the vehicle to run in the curve at a speed less than or equal to the safety speed, and performs deceleration control on the vehicle, to ensure that the vehicle stops at the position that is greater than or equal to the first safety distance from the end point of the curve.

When running in the curve, the vehicle may further communicate with another vehicle running in the curve. To be specific, in a process of changing a motion state of the vehicle, the vehicle may further receive historical motion trail information or future motion trail information sent by the another vehicle running in the curve, to assist the vehicle to avoid collision with the another vehicle in the curve, so that the vehicle stops after more safely driving out of the curve.

It should be noted that, in a specific implementation, a specific stopping position of the vehicle after the end point of the curve may be further determined with reference to traffic regulations for a curve section and the first safety distance.

It can be learned that, in this embodiment of this application, when the vehicle monitors, in the curve, the driving safety information that affects normal running of the vehicle, the vehicle is controlled, with reference to the position of the vehicle and the curve information sent by the road side unit, to stop at a position that is a preset distance from the end point of the curve after exiting the curve. The preset distance after the end point of the curve ensures that the vehicle behind in the curve has a sufficiently good field of view and a sufficiently long reaction time to take an avoidance measure in time, so that a rear-end collision accident between vehicles is avoided.

Figure 9:
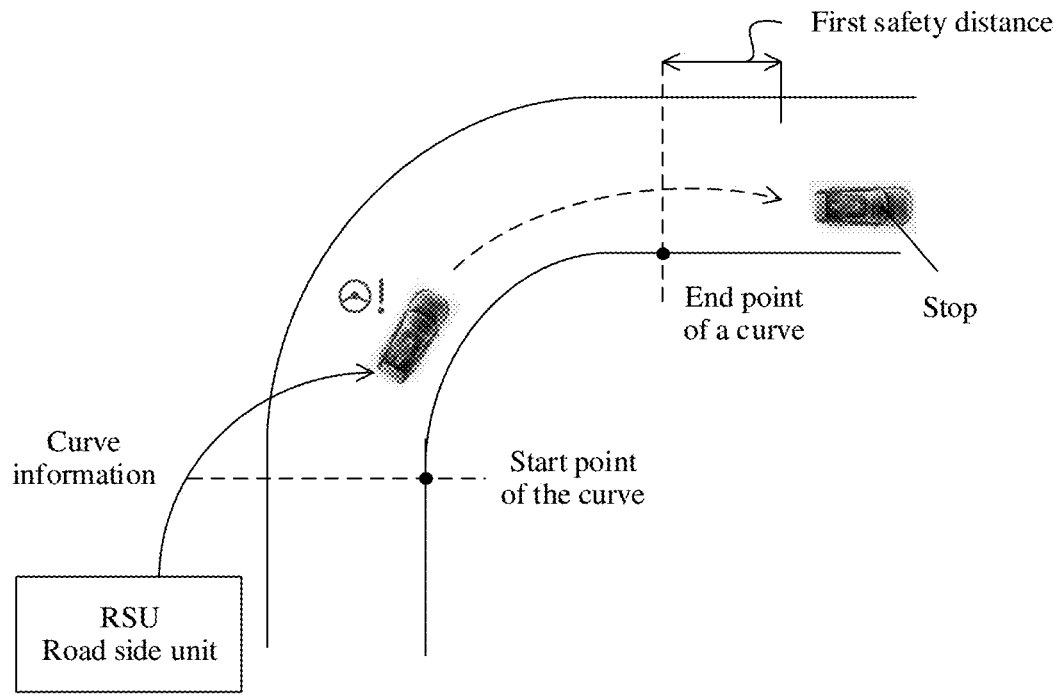
FIG. 9(1) and FIG. 9(2) are a schematic diagram of some scenarios after an automated vehicle enters a curve according to an embodiment of this application.
Figure 9:
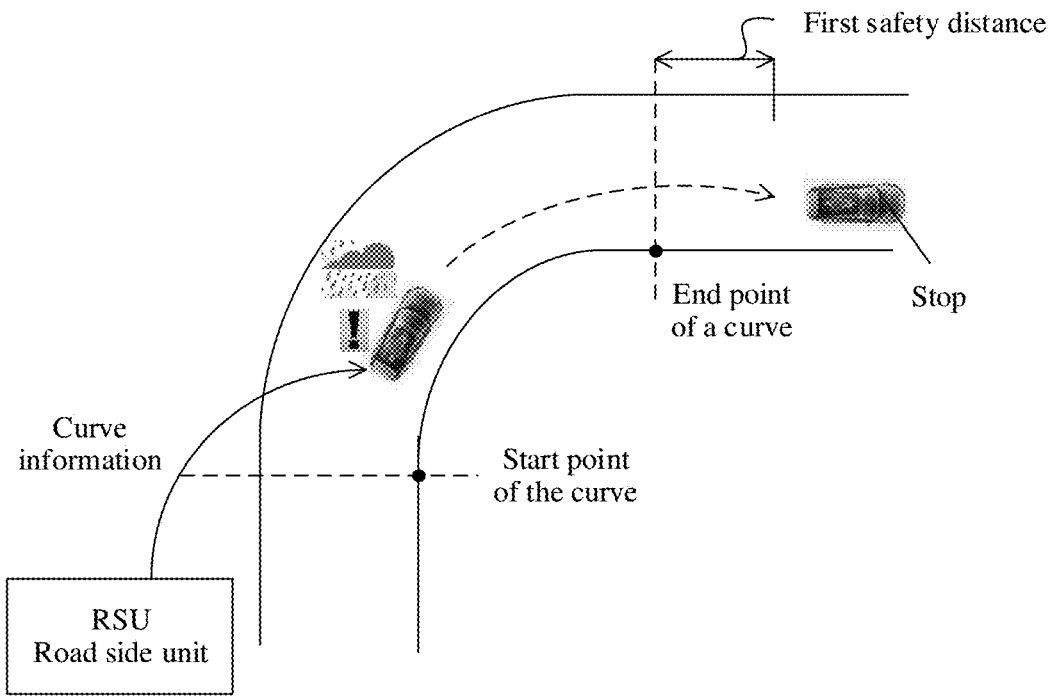

Refer to FIG. 9(1) and FIG. 9(2). The following describes the method in the embodiment of FIG. 8 by using some specific application scenarios.

In an application scenario of this application, as shown in FIG. 9(1), a vehicle has entered a curve, and detects that a fault occurs in a sensor of the vehicle in a running process. For example, a steering function of a steering mechanism is insensitive, to be specific, a set rotation angle of a steering wheel and an actual steering angle of the vehicle do not meet a preset relationship. In response to detected fault information, the vehicle receives curve information (including positions of a start point and an end point of the curve and a curvature radius of the curve) sent by a road side unit (RSU), obtains, based on the curvature radius of the curve, a safety speed of the vehicle in the curve and a safe stopping distance (also referred to as a first safety distance in this application) after the curve, and controls the vehicle to decelerate to ensure that the vehicle stops at a position that is the first safety distance from the end point of the curve. In some possible application scenarios, the vehicle may be further controlled to stop at a position that is greater than the first safety distance from the end point of the curve.

In another application scenario of this application, as shown in FIG. 9(2), the vehicle has entered the curve. The curve is currently under a rainstorm. A rainfall sensor in the vehicle detects that rainfall in a current driving environment is greater than a rainfall threshold preset in an automated driving system of the vehicle (that is, the current environment no longer meets an environmental condition preset in the automated driving system) and gives an environmental risk warning to the system of the vehicle. The vehicle receives, in response to the environmental risk warning information, the curve information (including the positions of the start point and the end point of the curve and the curvature radius of the curve) sent by the road side unit (RSU), obtains, based on the curvature radius of the curve, the safety speed of the vehicle in the curve and the safe stopping distance (also referred to as the first safety distance in this application) after the curve, and controls the vehicle to decelerate to ensure that the vehicle stops at the position that is the first safety distance from the end point of the curve. In some possible application scenarios, the vehicle may be further controlled to stop at a position that is greater than the first safety distance from the end point of the curve.

Figure 10:
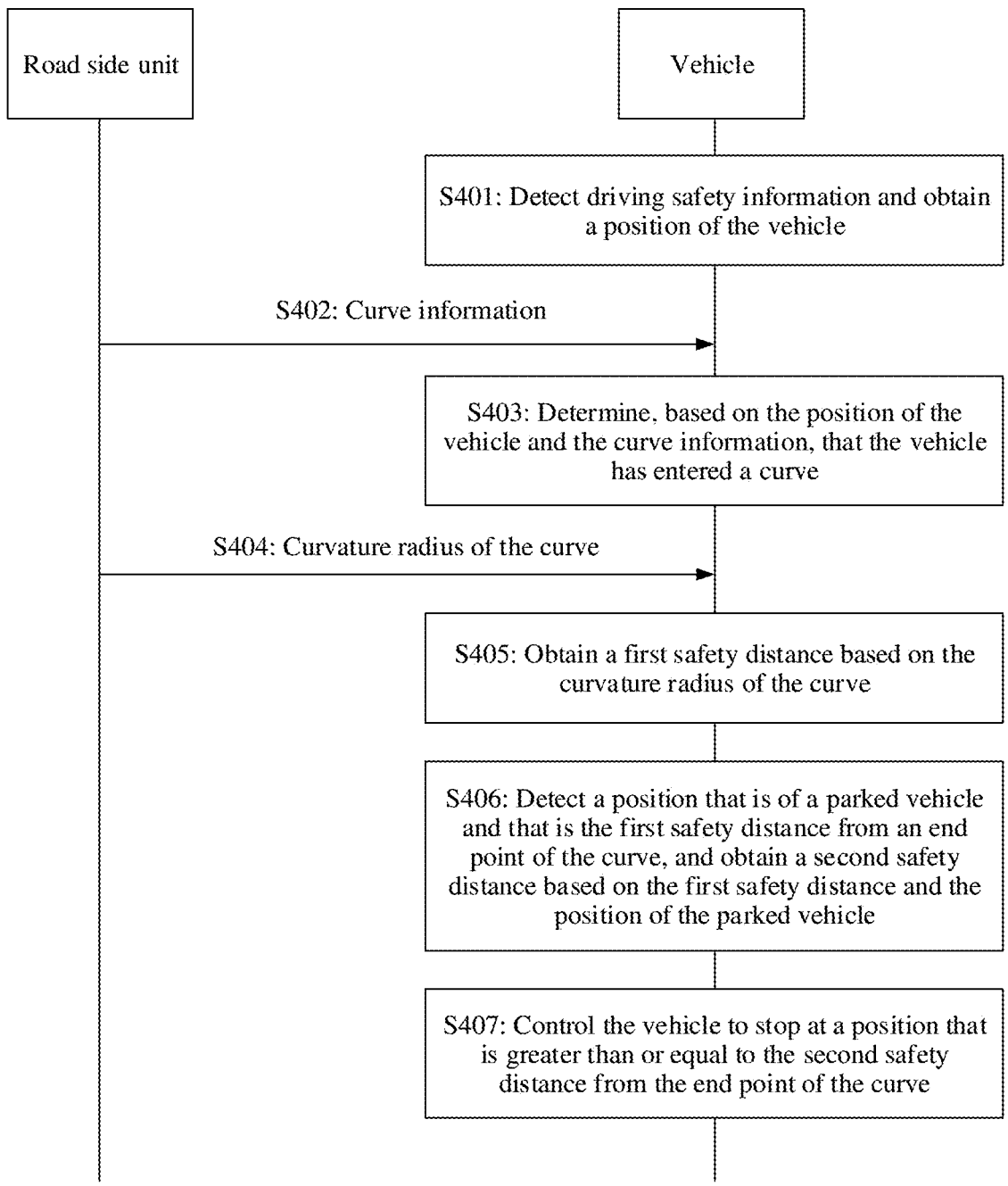
FIG. 10 is a flowchart of another method for controlling an automated vehicle after the automated vehicle enters a curve according to an embodiment of this application.

Refer to FIG. 10. The following describes a method for controlling an automated vehicle after the automated vehicle enters a curve according to an embodiment of this application, to describe a possible implementation scenario of a solution when the vehicle has entered the curve. The method includes but is not limited to the following steps.

S401: The vehicle detects driving safety information and obtains a position of the vehicle. For a specific implementation of this step, refer to related descriptions of step S202 and step S203 in the embodiment of FIG. 6. Details are not described herein again.

S402: A road side unit sends curve information to the vehicle. For a specific implementation of this step, refer to related descriptions of step S204 in the embodiment of FIG. 6. Details are not described herein again.

S403: Determine, based on the position of the vehicle and the curve information, that the vehicle has entered the curve. For a specific implementation of this step, refer to related descriptions of step S303 in the embodiment of FIG. 8. Details are not described herein again.

S404: The road side unit sends a curvature radius of the curve to the vehicle. For a specific implementation of this step, refer to related descriptions of step S304 in the embodiment of FIG. 8. Details are not described herein again.

S405: Obtain a first safety distance based on the curvature radius of the curve. For a specific implementation of this step, refer to related descriptions of step S305 in the embodiment of FIG. 8. Details are not described herein again.

S406: Detect a position that is of a parked vehicle and that is the first safety distance from an end point of the curve, and obtain a second safety distance based on the first safety distance and the position of the parked vehicle.

Specifically, after the vehicle obtains the first safety distance, when approaching the end point of the curve, the vehicle detects, by using a camera or a sensor of the vehicle, that there is the parked vehicle at the position that is the first safety distance from the end point of the curve. In this case, the vehicle cannot stop at a pre-calculated position that is the first safety distance from the end point of the curve. Therefore, the vehicle re-determines, based on the obtained position of the parked vehicle in front and the first safety distance, the second safety distance suitable for safely stopping a vehicle. It can be learned that the second safety distance is greater than the first safety distance.

It should be noted that the vehicle may detect the position of the parked vehicle by using the sensor of the vehicle, and the obtained position of the parked vehicle after the end point of the curve may alternatively be sent by the road side unit or may be a stopping position that is received from the parked vehicle and that is broadcast by the parked vehicle based on vehicle-to-vehicle communication.

It should be noted that the second safety distance may be a simple sum of the first safety distance and a length of a body of the parked vehicle. When a distance between the parked vehicle and the end point of the curve is greater than the first safety distance, the second safety distance may also be the distance between the parked vehicle and the end point of the curve. Alternatively, the second safety distance may be calculated based on the position of the parked vehicle and the first safety distance and with reference to a running status of the vehicle.

In another embodiment of this application, the position of the parked vehicle the first safety distance from the end point of the curve may be detected and sent to the vehicle by the road side unit (RSU). In this case, the vehicle may be running in the curve, and does not detect the parked vehicle at the end point of the curve within a current field of view. In this case, the vehicle may directly perform calculation in advance based on the obtained position of the end point of the curve, the position of the parked vehicle, and the curvature radius of the curve, to obtain the second safety distance of the vehicle.

S407: Control the vehicle to stop at a position that is greater than or equal to the second safety distance from the end point of the curve.

Specifically, the vehicle controls, based on a safety speed obtained in step S405, the vehicle to run in the curve at a speed less than or equal to the safety speed, to ensure that the vehicle safely runs out of the curve. In addition, the vehicle is decelerated to ensure that the vehicle stops at a position that is the second safety distance from the end point of the curve. Certainly, in some possible embodiments, the vehicle may be stopped at a position that is greater than the second safety distance from the end point of the curve.

In another embodiment of this application, if the vehicle detects that there is a parked vehicle at a predicted stopping position (namely, the position that is the first safety distance from the end point of the curve) after the curve in an original lane, step S406 and step S407 may not be performed. If a sensor system in the vehicle is good, the vehicle may further be controlled to perform a lane change operation after exiting the curve to ensure that the vehicle stops at a position that is in a lane adjacent to a lane in which the parked vehicle is located and that is greater than or equal to the first safety distance from the end point of the curve.

It should be noted that, in a specific implementation, a specific stopping position of the vehicle after the end point of the curve may be further determined with reference to traffic regulations for a curve section and the second safety distance.

It can be learned that, in this embodiment of this application, when the vehicle detects, in the curve, the driving safety information that affects normal running of the vehicle, the vehicle can obtain a preset stopping position after the curve with reference to the position of the vehicle and the curve information sent by the road side unit. If the vehicle detects that the preset stopping position is occupied by a parked vehicle in a process of exiting the curve, the vehicle may recalculate a stopping position after the curve, so that a vehicle behind in the curve can take an avoidance measure in time when discovering the vehicle. This avoids a rear-end collision accident between vehicles, and improves driving safety of the vehicle.

Figure 11:
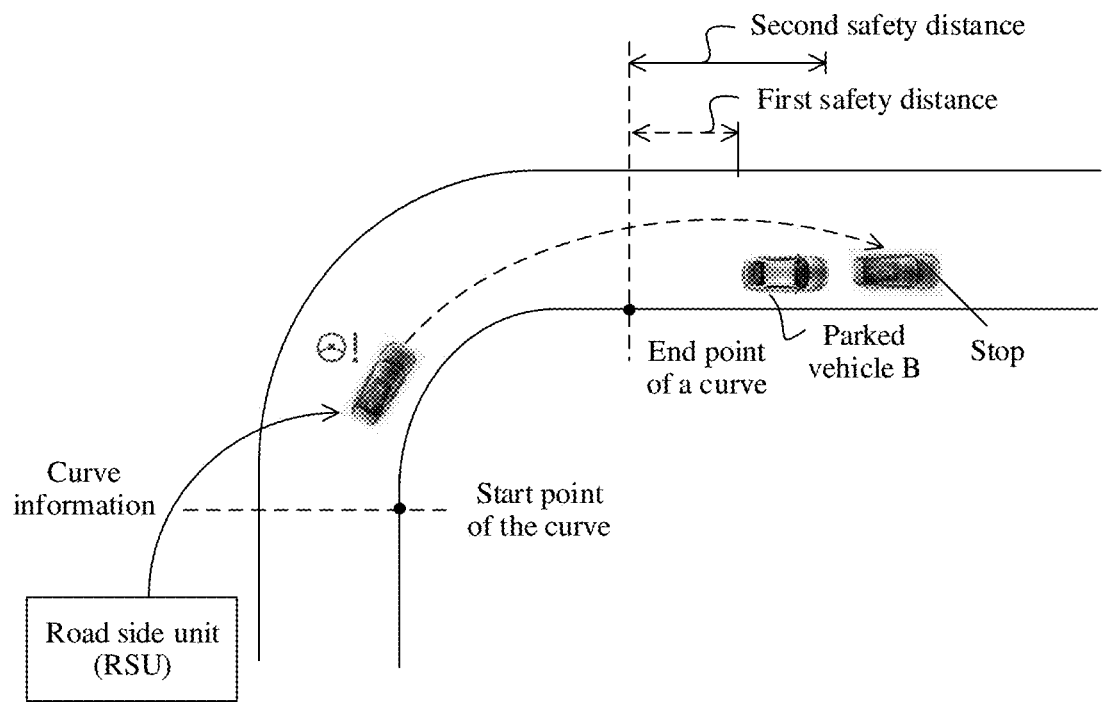
FIG. 11(1) to FIG. 11(3) are a schematic diagram of some scenarios after an automated vehicle enters a curve according to an embodiment of this application.
Figure 11:
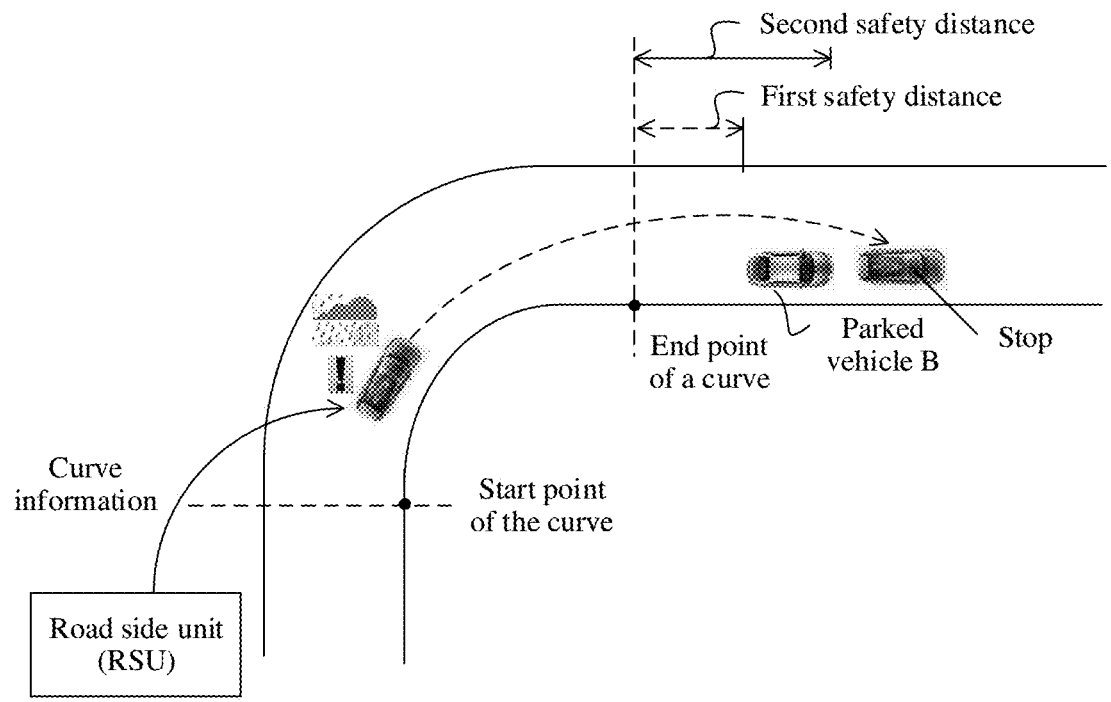
Figure 11:
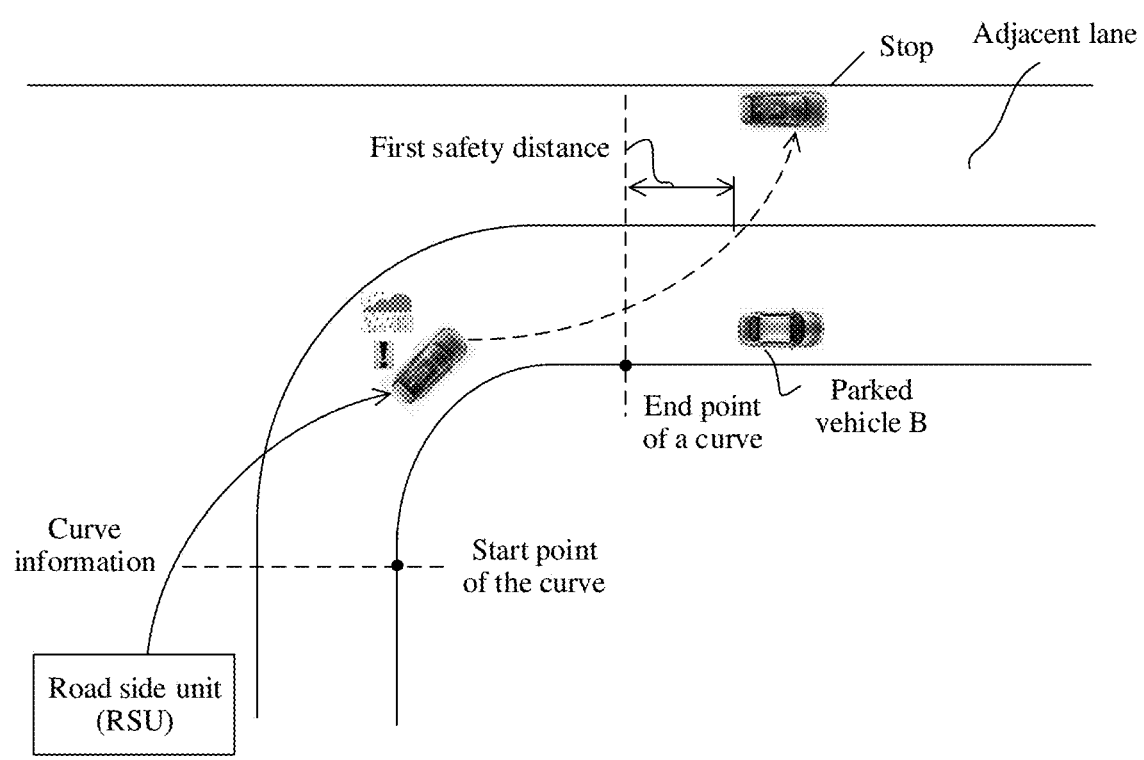

Refer to FIG. 11(1) to FIG. 11(3). The following describes the method in the embodiment of FIG. 10 by using some specific application scenarios.

In an application scenario of this application, as shown in FIG. 11(1), a vehicle has entered a curve. When detecting that a fault occurs in a hardware apparatus (for example, a side-rear sensor of the vehicle or a steering mechanism) of the vehicle, the vehicle receives curve information (including positions of a start point and an end point of the curve and a curvature radius of the curve) sent by a road side unit (RSU), obtains a first safety distance and a safety speed of the vehicle based on the curvature radius in the curve information, and controls the vehicle to run at a speed not greater than the safety speed. When approaching the end point of the curve, the vehicle detects that there is a parked vehicle B at a position that is the first safety distance from the end point of the curve and obtains a position of the parked vehicle B. Then, the vehicle calculates a second safety distance based on the position of the parked vehicle B and the first safety distance, or based on the position of the parked vehicle B, the first safety distance, and a real-time speed of the vehicle, and controls the vehicle to stop at a position that is the second safety distance from the end point of the curve. In some possible application scenarios, the vehicle may be further controlled to stop at a position that is greater than the second safety distance from the end point of the curve.

In another application scenario of this application, as shown in FIG. 11(2), the vehicle has entered the curve, and the curve is currently under a rainstorm. A rainfall sensor in the vehicle detects that rainfall in a current driving environment is greater than a rainfall threshold preset in an automated driving system of the vehicle and gives an environmental risk warning to the system of the vehicle. The vehicle receives, in response to the environmental risk warning information, the curve information (including the positions of the start point and the end point of the curve and the curvature radius of the curve) sent by the road side unit (RSU), obtains the first safety distance and the safety speed of the vehicle based on the curvature radius of the curve, and controls the vehicle to run at a speed not greater than the safety speed. When approaching the end point of the curve, the vehicle detects that there is the parked vehicle B nearby the end point, and obtains the position of the parked vehicle B. When a distance between the parked vehicle B and the end point of the curve is greater than or equal to the first safety distance, the vehicle recalculates, based on the first safety distance and the position of the parked vehicle B, the second safety distance suitable for the vehicle to stop, and finally controls the vehicle to stop at the position that is the second safety distance from the end point of the curve. In some possible application scenarios, the vehicle may be further controlled to stop at the position that is greater than the second safety distance from the end point of the curve.

In another application scenario of this application, as shown in FIG. 11(3), the vehicle running in the curve detects that rainfall, namely, a current driving environment parameter, exceeds the rainfall threshold preset in the automated driving system, and an environmental risk warning is given to the system. The vehicle receives the curve information sent by the road side unit, obtains parameters such as the first safety distance and the safety speed of the vehicle based on the curve information, and controls the vehicle to run at the safety speed. When the vehicle approaches the end point of the curve, if the vehicle detects that there is a parked vehicle at a preset stopping position (namely, a position that is the first safety distance from the end point of the curve) in a current lane after the curve, the vehicle is controlled to stop at a position that is in an adjacent lane and that is the first safety distance from a straight line in which the end point of the curve is located. In some possible application scenarios, the adjacent lane may alternatively be an emergency stopping area on the rightmost side of the current lane.

Figure 12:
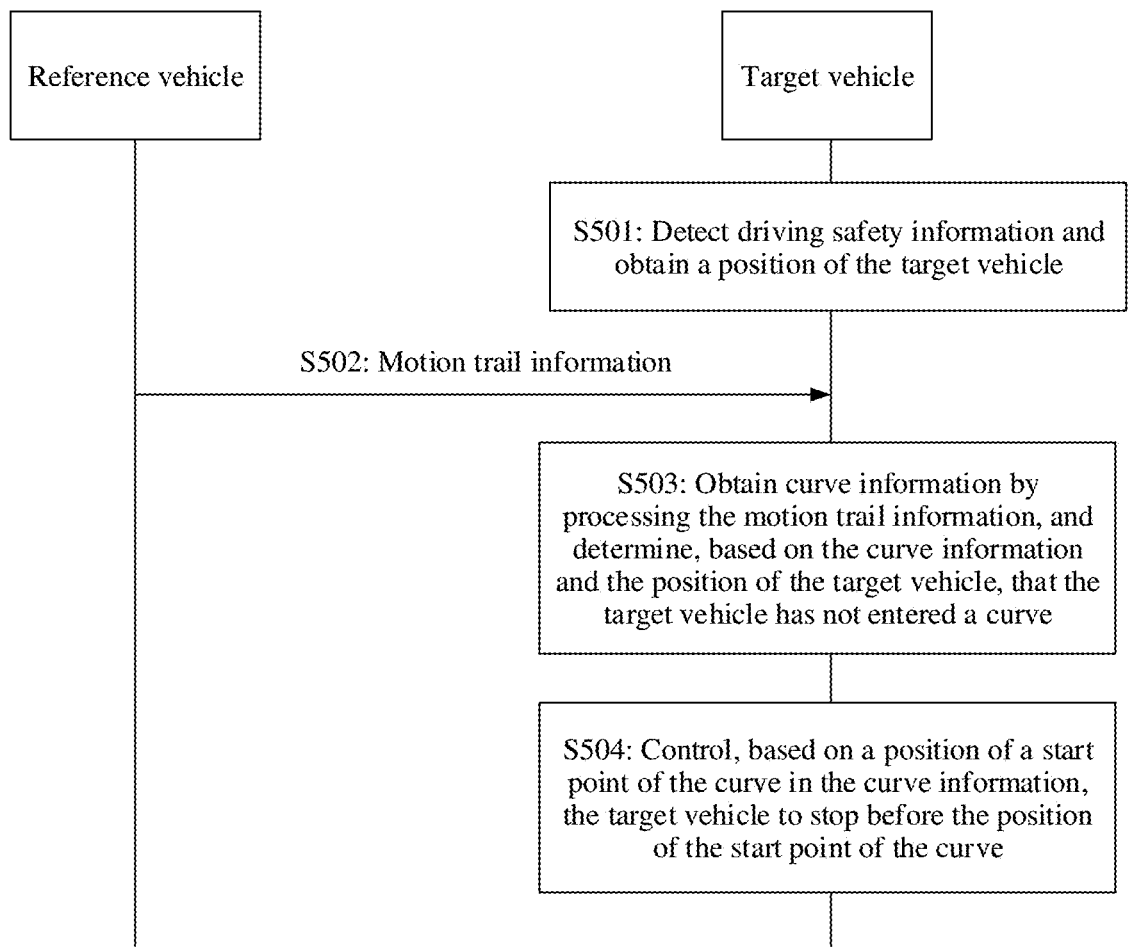
FIG. 12 is a flowchart of another method for controlling an automated vehicle before the automated vehicle enters a curve according to an embodiment of this application.

Refer to FIG. 12. The following describes another method for controlling an automated vehicle before the automated vehicle enters a curve according to an embodiment of this application, to describe a possible implementation scenario of a solution when the vehicle has not entered the curve. The method includes but is not limited to the following steps.

S501: The vehicle detects driving safety information and obtains a position of a target vehicle. For a specific implementation of this step, refer to related descriptions of step S202 and step S203 in the embodiment of FIG. 6. Details are not described herein again.

S502: A reference vehicle in the curve sends motion trail information to the target vehicle.

To distinguish the reference vehicle from the vehicle in this application, the vehicle in this application may also be referred to as the target vehicle. Specifically, the target vehicle may communicate with the reference vehicle that normally runs in the curve. Therefore, the target vehicle may receive the motion trail information sent by the reference vehicle that has entered the curve. The motion trail information includes at least a position of a start point of the curve.

It should be noted that the reference vehicle in this application is a normally running vehicle that is located in front of the target vehicle and that has entered the curve, and the motion trail information of the reference vehicle may be historical motion trail information, or may be future motion trail information. The motion trail information of the reference vehicle includes at least the position of the start point of the curve, and certainly, may further include a position of an end point of the curve, real-time rotation angle information of the vehicle, and the like.

S503: The vehicle obtains curve information based on the motion trail information of the reference vehicle, and determines, based on the curve information and the position of the target vehicle, that the target vehicle has not entered the curve.

Specifically, the target vehicle and the reference vehicle in the curve may implement a vehicle-to-vehicle communication function based on a wireless communications system. The motion trail information of the reference vehicle includes the position of the start point of the curve, the position of the end point of the curve, and the like. The target vehicle obtains the position of the start point of the curve from the motion trail information of the reference vehicle, and then determines a relative position relationship between the target vehicle and the curve with reference to the position of the target vehicle. When the relative position relationship indicates that the vehicle is outside the curve and a running direction of the vehicle is the same as a direction of the curve, it may be determined that the target vehicle has not entered the curve.

S504: Control, based on the position of the start point of the curve in the curve information, the target vehicle to stop before the position of the start point of the curve.

Specifically, the target vehicle calculates a distance between the position of the target vehicle and the position of the start point of the curve, a braking force threshold for the vehicle to stop (in other words, a speed of the vehicle is zero) at the position of the start point of the curve may be calculated based on a real-time speed of the target vehicle, and then a brake mechanism of the vehicle is controlled to provide a braking force greater than or equal to the braking force threshold to change a motion state of the vehicle, to ensure that the vehicle stops at a position before the start point of the curve.

In another embodiment of this application, if the target vehicle detects that a fault occurs in the target vehicle before entering the curve, and after receiving the motion trail information sent by the reference vehicle in the curve and determining the position of the start point of the curve, the target vehicle detects that there is a parked vehicle before the position of the start point of the curve, the target vehicle calculates a distance between the position of the target vehicle and a position of the parked vehicle, and controls the vehicle to decelerate to ensure that the target vehicle stops before the position of the parked vehicle before the start point of the curve, to prevent a collision with the parked vehicle.

It should be noted that the vehicle may detect the position of the parked vehicle by using a sensor of the vehicle, and the obtained position of the parked vehicle may alternatively be sent by a road side unit or may be a stopping position that is received from the parked vehicle and that is broadcast by the parked vehicle based on vehicle-to-vehicle communication.

It should be noted that, in a specific implementation, a specific stopping position of the vehicle before the start point of the curve may be further determined with reference to traffic regulations for a curve section.

It can be learned that, in this embodiment of this application, when the vehicle monitors, before entering the curve, the driving safety information that affects normal running of the vehicle, the vehicle receives, based on vehicle-to-vehicle communication, a motion trail that is sent by another vehicle in the curve and that includes the curve information. In combination with the position of the vehicle and the curve information, the vehicle is controlled to stop before entering the curve or to stop after the safely passing through the curve, so that the vehicle is stopped outside the curve and a rear-end collision of the vehicle caused by stopping in the curve is avoided. In addition, regardless of whether the vehicle stops before the start point of the curve or after the end point of the curve, a vehicle behind has a sufficiently good field of view and a sufficiently long reaction time to take an avoidance measure. This improves driving safety of the vehicle and reduces traffic accidents on a curve section.

Figure 13:
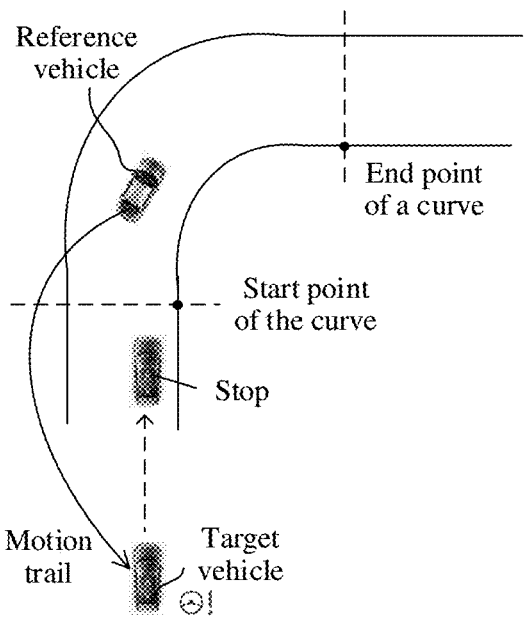
FIG. 13(1) to FIG. 13(4) are a schematic diagram of some scenarios before an automated vehicle enters a curve according to an embodiment of this application.
Figure 13:
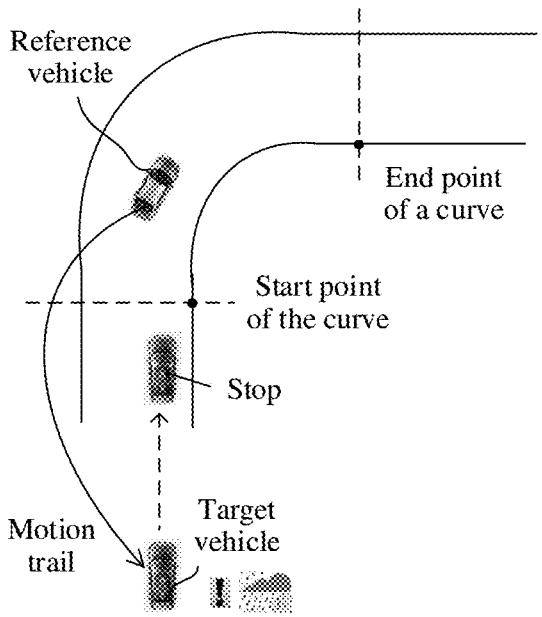
Figure 13:
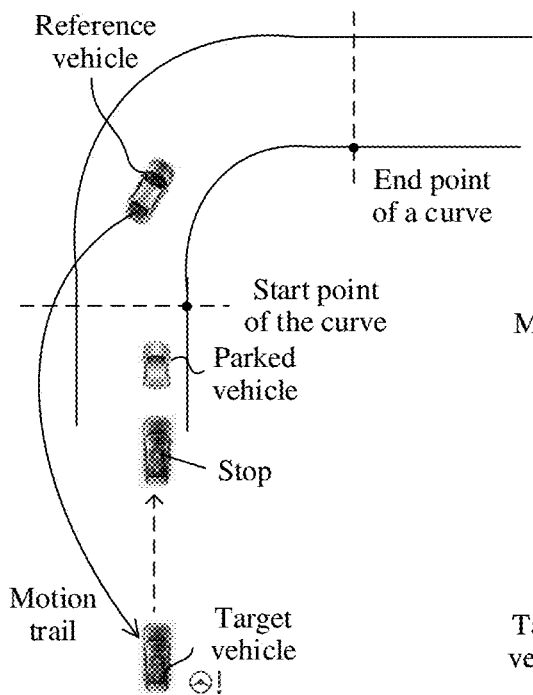
Figure 13:
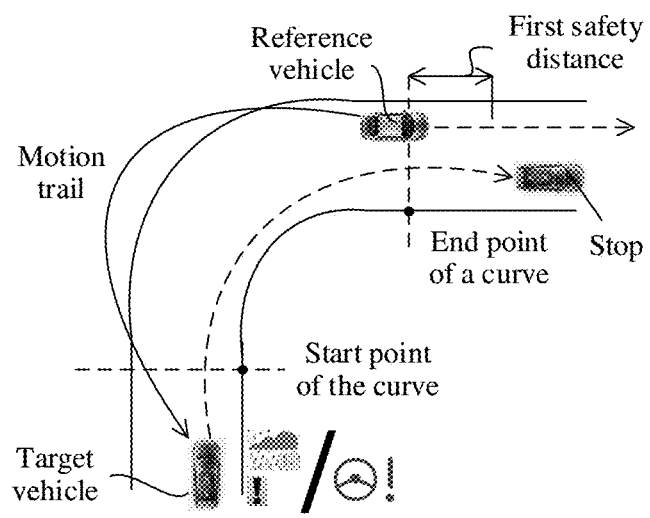

Refer to FIG. 13(1) to FIG. 13(4). The following describes the method in the embodiment of FIG. 12 by using some specific application scenarios.

As shown in FIG. 13(1), before entering a curve, a target vehicle detects that a fault occurs in the vehicle itself, for example, a fault occurs in a side-rear sensor of the vehicle or a steering mechanism is insensitive, or the target vehicle detects that rainfall in a current rainstorm environment exceeds a rainfall threshold preset in an automated driving system of the vehicle (that is, a current driving environment no longer meets an environmental condition preset in the automated driving system) (as shown in FIG. 13(2)). In this case, the target vehicle receives motion trail information sent by a reference vehicle normally running in the curve, obtains a position of a start point of the curve from the motion trail information, and controls, based on a distance between the target vehicle and the start point of the curve, the vehicle to decelerate to ensure that the vehicle stops before the start point of the curve. In some possible application scenarios, as shown in FIG. 13(3), in a deceleration process, the vehicle detects that there is a parked vehicle at a position before the start point of the curve, and the target vehicle obtains a position of the parked vehicle, calculates a distance between the target vehicle and the parked vehicle, and controls the vehicle to decelerate to ensure that the target vehicle stops behind the parked vehicle.

In another application scenario of this application, as shown in FIG. 13(4), before entering the curve, the target vehicle detects that a current driving environment parameter exceeds an environment parameter preset in the automated driving system (for example, rainfall exceeds a threshold) or detects that a fault occurs in a sensor of the vehicle, receives the motion trail information sent by the reference vehicle, obtains a position of an end point of the curve and a curvature radius of the curve from the motion trail information, and obtains a first safety distance and a safety speed based on the curvature radius of the curve. In this case, the target vehicle is controlled to run at a speed not greater than the safety speed, and the target vehicle is stopped at a position greater than or equal to the first safety distance from the end point of the curve.

Figure 14:
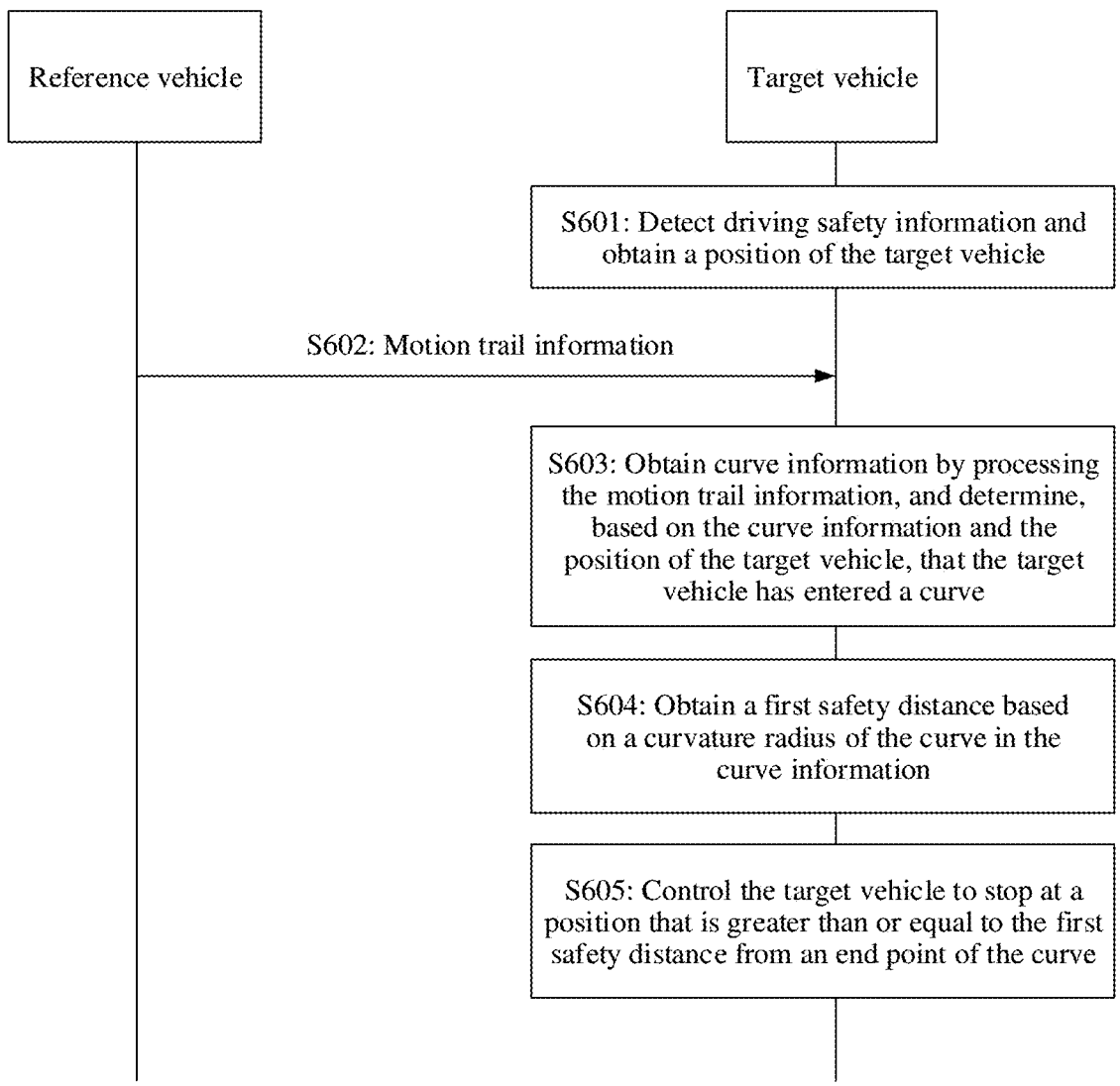
FIG. 14 is a flowchart of another method for controlling an automated vehicle after the automated vehicle enters a curve according to an embodiment of this application.

Refer to FIG. 14. The following describes another method for controlling an automated vehicle after the automated vehicle enters a curve according to an embodiment of this application, to describe a possible implementation scenario of a solution when the vehicle has entered the curve. The method includes but is not limited to the following steps.

S601: Detect driving safety information and obtain a position of a target vehicle. For a specific implementation of this step, refer to related descriptions of step S202 and step S203 in the embodiment of FIG. 6. Details are not described herein again.

S602: A reference vehicle sends motion trail information to the target vehicle.

Specifically, the target vehicle and the reference vehicle in the curve may implement a vehicle-to-vehicle communication function based on a wireless communications system. The reference vehicle is a vehicle normally running in the curve, and the motion trail information sent by the reference vehicle may be at least one of historical motion trail information and future motion trail information. The motion trail information includes at least position information of a start point and an end point of the curve and a curvature radius of the curve.

S603: Obtain curve information based on the motion trail information of the reference vehicle, and determine, based on the curve information and the position of the target vehicle, that the target vehicle has entered the curve.

Specifically, after receiving the motion trail information sent by the reference vehicle, the target vehicle may obtain the start point and the end point of the curve based on the motion trail information, and may roughly calculate the curvature radius of the curve with reference to a shape of a motion trail after the start point and the end point of the curve are determined. A real-time position of the target vehicle is compared with positions of the start point and the end point of the curve to determine a relative position relationship between the target vehicle and the curve. When the relative position relationship is that the target vehicle is in the curve, it indicates that the target vehicle has entered the curve. In a possible embodiment, the position of the target vehicle may be further compared with position information of the reference vehicle in the motion trail information of the reference vehicle, to determine that the target vehicle has entered the curve.

In some possible embodiments, in addition to receiving the motion trail information sent by the reference vehicle, the target vehicle may further obtain, in real time, steering wheel rotation angle information sent by the reference vehicle, and process the obtained steering wheel rotation angle information by using an algorithm to obtain a more accurate curvature radius of the curve.

S604: Obtain a first safety distance based on the curvature radius of the curve in the curve information. For a specific implementation of this step, refer to related descriptions of step S305 in the embodiment of FIG. 8. Details are not described herein again.

S605: Control the target vehicle to stop at a position that is greater than or equal the first safety distance from the end point of the curve. For a specific implementation of this step, refer to related descriptions of step S306 in the embodiment of FIG. 8. Details are not described herein again.

In some possible embodiments, although the vehicle obtains the first safety distance, when approaching the end point of the curve, the target vehicle detects, by using a camera or a sensor of the target vehicle, that there is a parked vehicle at the position that is the first safety distance from the end point of the curve. In this case, the target vehicle cannot stop at a pre-calculated position that is the first safety distance from the end point of the curve. Therefore, the target vehicle re-determines, based on an obtained position of the parked vehicle in front and the first safety distance, a second safety distance suitable for safely stopping a vehicle. It can be learned that the second safety distance is greater than the first safety distance. Finally, the target vehicle runs at a speed not greater than the safety speed in step S604, and stops at a position that is the second safety distance from the end point of the curve. Certainly, in some possible embodiments, the vehicle may be stopped at a position that is greater than the second safety distance from the end point of the curve.

In another embodiment of this application, if the vehicle detects that there is a parked vehicle at a predicted stopping position (namely, the position that is the first safety distance from the end point of the curve) after the curve in an original lane, and a sensor system in the vehicle is good, the vehicle may further be controlled to perform a lane change operation after exiting the curve to ensure that the vehicle stops at a position that is in a lane adjacent to a lane in which the parked vehicle is located and that is greater than or equal to the first safety distance from the end point of the curve.

It should be noted that a position of a parked vehicle near the end point of the curve may be detected by the target vehicle, or may be detected by the reference vehicle and sent to the target vehicle, or may be received from the parked vehicle and be broadcast by the parked vehicle through vehicle-to-vehicle communication. In this case, the target vehicle may directly calculate the second safety distance in advance based on the position of the end point of the curve, the curvature radius of the curve, and the position of the parked vehicle.

It should be noted that the target vehicle in FIG. 14 is the vehicle in the embodiments of FIG. 6 and FIG. 8.

It should be noted that, in a specific implementation, a specific stopping position of the vehicle after the end point of the curve may be further determined with reference to traffic regulations for a curve section and the first safety distance or with reference to traffic regulations for a curve section and the second safety distance.

It may be learned that, in this embodiment of this application, when detecting, in the curve, the driving safety information that affects normal running of the vehicle, the vehicle receives, based on vehicle-to-vehicle communication, a motion trail that is sent by another vehicle in the curve and that includes the curve information. The vehicle is controlled, with reference to the position of the vehicle and the curve information, to stop at a position a preset distance from the end point of the curve after exiting the curve. The vehicle may flexibly adjust the preset distance based on whether another parked vehicle occupies a position after the curve, to avoid colliding with another parked vehicle at an exit of the curve and being collided by a vehicle behind driving out of the curve. This improves driving safety of the vehicle and reduces traffic accidents on a curve section.

Figure 15:
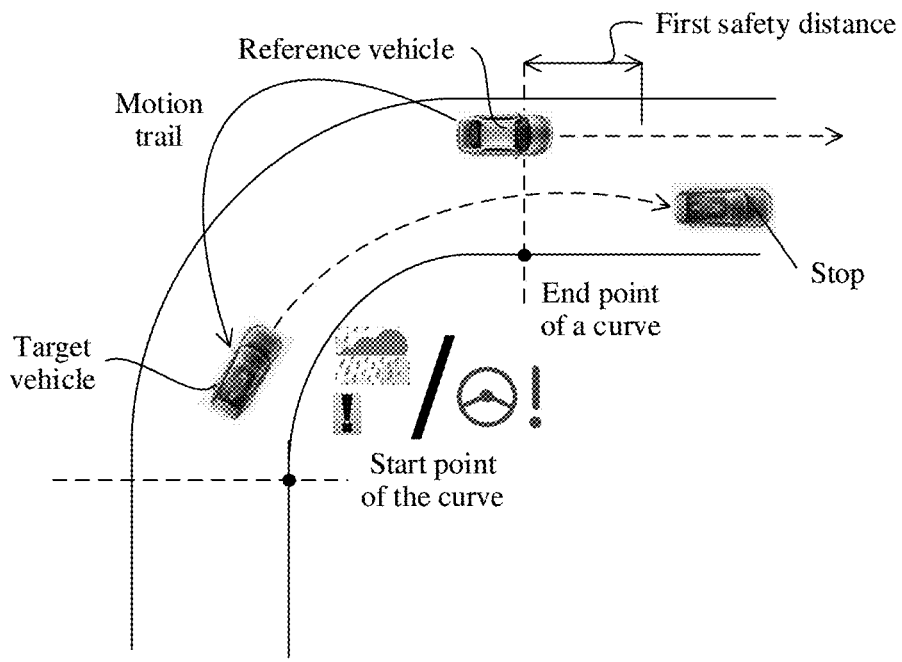
FIG. 15(1) to FIG. 15(3) are a schematic diagram of some scenarios after an automated vehicle enters a curve according to an embodiment of this application.
Figure 15:
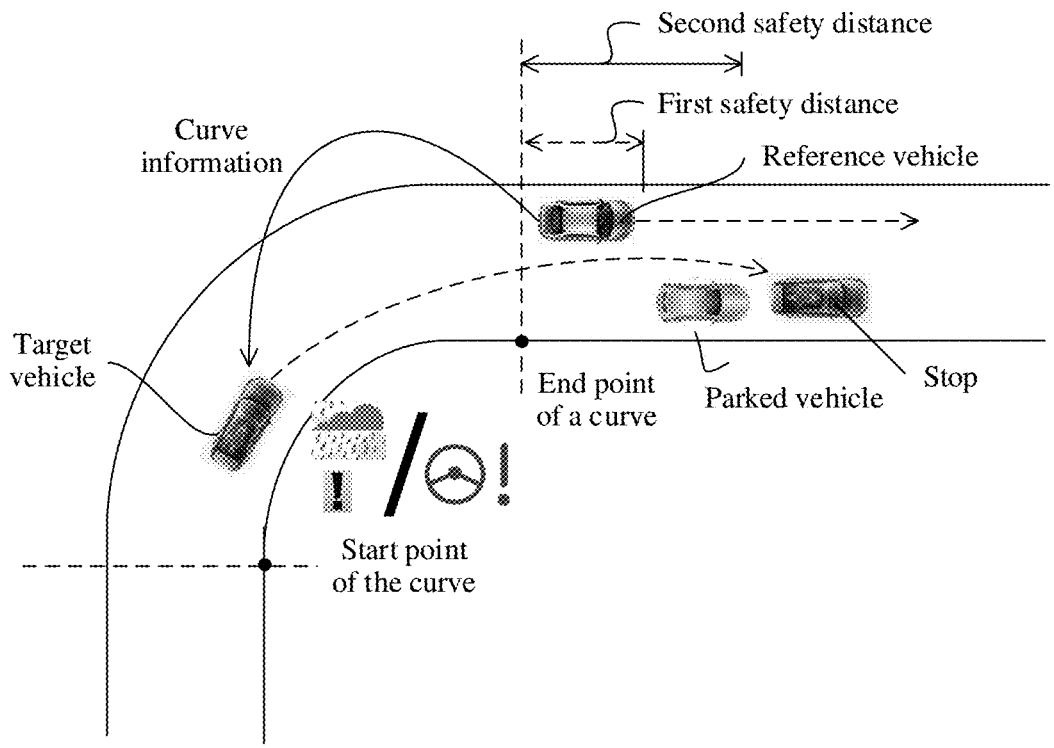
Figure 15:
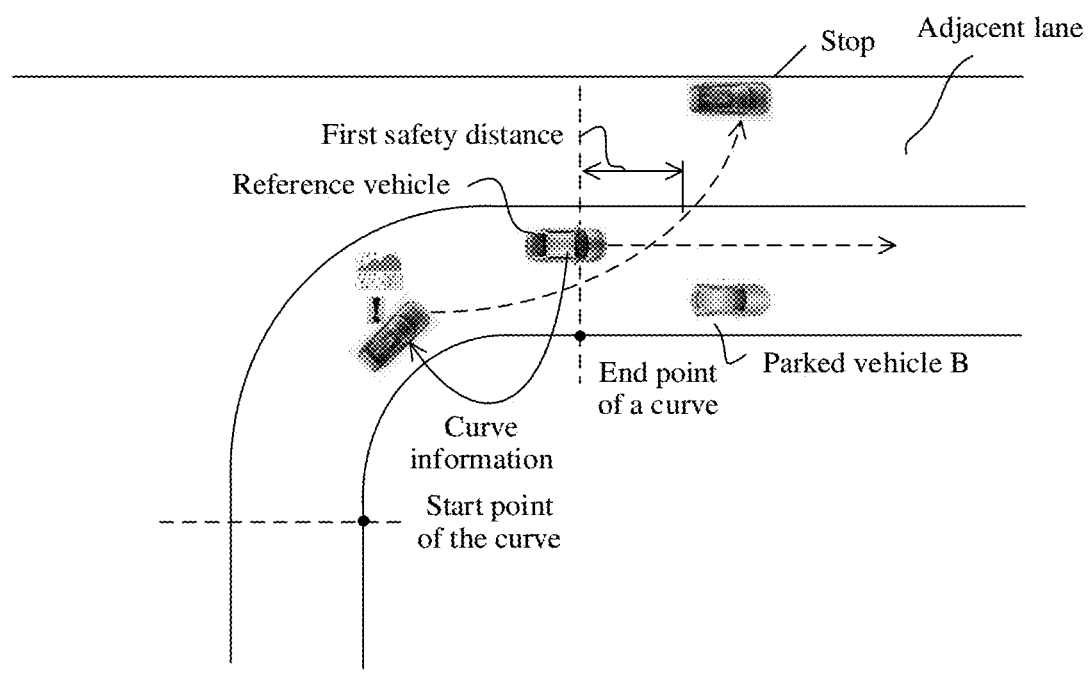

Refer to FIG. 15(1) to FIG. 15(3). The following describes the method in the embodiment of FIG. 14 by using some specific application scenarios.

In an application scenario of this application, as shown in FIG. 15(1), a target vehicle has entered a curve. The target vehicle detects that a current environment parameter exceeds an environmental condition (for example, rainfall exceeds a preset rainfall threshold) preset in an automated driving system or detects that a fault occurs in a hardware apparatus (for example, a side-rear sensor of the vehicle or a steering mechanism) of the target vehicle, receives motion trail information sent by a reference vehicle in the curve, obtains an end point of the curve and a curvature radius of the curve from the motion trail information, obtains a first safety distance and a safety speed based on the curvature radius of the curve and the end point of the curve, controls the target vehicle to run at a speed not greater than safety speed, and stops at a position that is the first safety distance from the end point of the curve. In some possible embodiments, the target vehicle may be stopped at a position that is greater than the first safety distance from the end point of the curve. In some possible scenarios, as shown in FIG. 15(2), when approaching the end point of the curve, the target vehicle detects that a parked vehicle occupies a stopping position at the position that is the first safety distance from the end point of the curve. The target vehicle obtains a position of the parked vehicle, obtains a second safety distance through recalculation based on the first safety distance and the position of the parked vehicle, and controls the target vehicle to stop at a position that is the second safety distance from the end point of the curve. In some possible scenarios, the target vehicle may be stopped at a position that is greater than the second safety distance from the end point of the curve.

In another application scenario of this application, as shown in FIG. 15(3), the vehicle running in the curve detects that rainfall, namely, a current driving environment parameter, exceeds the rainfall threshold preset in the automated driving system, and an environmental risk warning is given to the system. The vehicle receives motion trail information sent by a vehicle normally running in the curve, obtains, based on the motion trail information, a start point, the end point, the curvature radius, and the like of the curve in which the vehicle is located, to obtain parameters such as the first safety distance and the safety speed of the vehicle, and controls the vehicle to run at the safety speed. When the vehicle approaches the end point of the curve, if the vehicle detects that there is a parked vehicle at a preset stopping position (namely, the position that is the first safety distance from the end point of the curve) in a current lane after the curve, the vehicle is controlled to stop at a position that is in an adjacent lane and that is the first safety distance from a straight line in which the end point of the curve is located. In some possible application scenarios, the adjacent lane may alternatively be an emergency stopping area on the rightmost side of the current lane.

Figure 16:
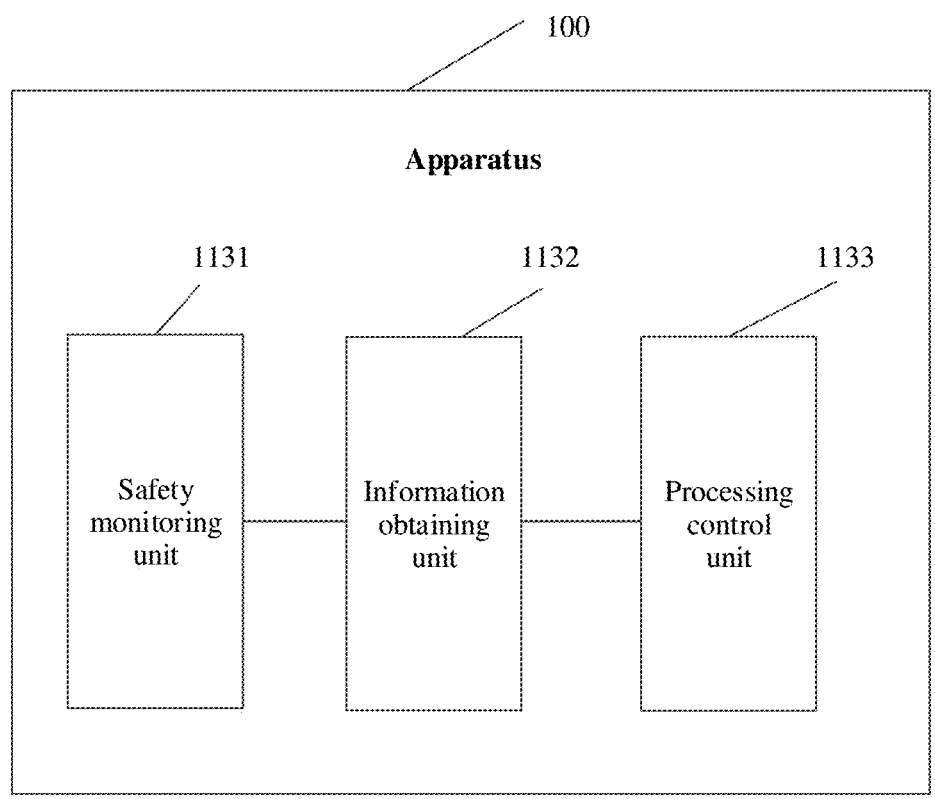
FIG. 16 is a schematic diagram of a functional structure of an apparatus used in an automated vehicle according to an embodiment of this application.

Refer to FIG. 16. An embodiment of this application provides a diagram of a functional structure of an apparatus used in an automated vehicle. The apparatus 100 includes a safety monitoring unit 1131, an information obtaining unit 1132, and a processing control unit 1133. The apparatus 100 may be implemented through hardware, software, or a combination of software and hardware. For example, the safety monitoring unit 1131 may be the steering mechanism 136, the brake mechanism 140, the radar 130, a lidar 132, or the like in FIG. 3, or a rainfall sensor, a pressure sensor, or the like not shown in FIG. 3, or other hardware that can detect vehicle system fault information and vehicle driving environment information. The safety monitoring unit 1131 may be further implemented by using, for example, the transceiver 115 in FIG. 3, and is configured to receive curve obstacle information sent by a road side unit or the like. The information obtaining unit 1132 is implemented, for example, by using the transceiver 115 and/or the processor 113 in FIG. 3. The processing control unit 1133 may be, for example, a software module running in the processor 113 in FIG. 3.

The safety monitoring unit 1131 is configured to monitor driving safety information before a vehicle enters a curve or when the vehicle has entered the curve. The information obtaining unit 1132 is configured to obtain a position of the vehicle in response to the driving safety information. The information obtaining unit 1132 is further configured to obtain curve information, where the curve information includes at least one of a position of a start point of the curve and a position of an end point of the curve. The processing control unit 1133 is configured to control, based on the position of the vehicle and the curve information, the vehicle to stop at a position outside the curve.

Function modules of the apparatus 100 may be configured to implement the method shown in FIG. 5. In the embodiment of FIG. 5, the security monitoring unit 1131 may be configured to perform step S101, the information obtaining unit 1132 may be configured to perform step S102 and step S103, and the processing control unit 1133 may be configured to perform step S104. The function modules of the apparatus 100 may be further configured to perform the embodiments of FIG. 6, FIG. 8, FIG. 10, FIG. 12, and FIG. 14. For brevity of the specification, details are not described herein again in this application.

An embodiment of this application further provides a computer storage medium. The computer storage medium stores a computer program used for electronic data exchange, and the computer program enables a computer to perform some or all of the steps of any method described in the foregoing method embodiments.

An embodiment of this application further provides a computer program product. The computer program product includes a non-transitory computer-readable storage medium storing a computer program. The computer program is operable to enable a computer to perform some or all of the steps of any method described in the foregoing method embodiments. The computer program product may be a software installation package, and the computer includes an electronic device.

It should be noted that a person of ordinary skill in the art may learn that, all or some of the steps in each method of the foregoing embodiments may be implemented by a program instructing related hardware. The program may be stored in a computer-readable storage medium. The storage medium includes a read-only memory (ROM), a random access memory (RAM), a programmable read-only memory (PROM), an erasable programmable read-only memory (EPROM), a one-time programmable read-only memory (OTPROM), an electrically-erasable programmable read-only memory, (EEPROM), a compact disc read-only memory (CD-ROM), or another optical disk memory, magnetic disk memory, magnetic tape memory, or any other computer-readable medium that can be configured to carry or store data.

In the foregoing embodiments, the description of each embodiment has respective focuses. For a part that is not described in detail in an embodiment, refer to related descriptions in other embodiments.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a device (which may be a personal computer, a server, or a network device, a robot, a single-chip microcomputer, a chip, a robot, or the like) to perform all or some of the steps of the methods described in the embodiments of this application. The foregoing storage medium includes: any medium that can store program code, such as a USB flash drive, a removable hard disk, a read-only memory, a random access memory, a magnetic disk, or an optical disc.

The embodiments of this application are described in detail above. The principles and implementations of this application are described herein by using specific examples. The description about the embodiments is merely provided to help understand the method and core ideas of this application. In addition, a person of ordinary skill in the art can make variations and modifications in terms of the specific implementations and application scopes based on the ideas of this application. Therefore, the content of this specification shall not be construed as a limit to this application.

What is claimed is:

1. A method comprising:
   detecting driving safety information before a vehicle enters a curve of a road or when the vehicle has entered the curve;
   obtaining a position of the vehicle in response to detecting the driving safety information;
   obtaining curve information, wherein the curve information comprises at least one of a position of a start point of the curve or a position of an end point of the curve;
   determining a relative position relationship between the vehicle and the curve based on the position of the vehicle and the curve information, wherein the relative position relationship indicates whether the vehicle has entered the curve; and
   controlling, based on the relative position relationship, the vehicle to stop at a position outside the curve;
   wherein when the relative position relationship indicates that the vehicle has not entered the curve, controlling the vehicle to stop at the position outside the curve comprises:
     controlling the vehicle to stop at a position before the start point of the curve or controlling the vehicle to stop at a position after the end point of the curve; and
   wherein when the relative position relationship indicates that the vehicle has entered the curve, controlling the vehicle to stop at the position outside the curve comprises:
     obtaining a first safety distance, wherein the first safety distance is a maximum braking distance of the vehicle for preventing a vehicle behind from colliding with the vehicle;
     detecting a parked vehicle at the position that is greater than or equal to the first safety distance from the end point of the curve;
     obtaining a second safety distance based on the position of the parked vehicle and the first safety distance, wherein the second safety distance is greater than the first safety distance; and
     controlling the vehicle to stop at a position that is greater than or equal to the second safety distance from the end point of the curve.

2. The method according to claim 1,
   wherein the driving safety information is system fault information, and the system fault information indicates that a system fault occurs in the vehicle; and
   wherein detecting the driving safety information comprises:
     obtaining the system fault information by detecting a system status of the vehicle.

3. The method according to claim 1,
   wherein the driving safety information is environmental risk information, and the environmental risk information indicates that a driving environment of the vehicle does not meet a risk range preset in an automated driving system; and
   wherein detecting the driving safety information comprises:
     obtaining the environmental risk information by detecting a condition of an environment in which the vehicle is located.

4. The method according to claim 1,
   wherein the driving safety information is curve obstacle information, and the curve obstacle information indicates that there is an obstacle blocking traffic in the curve; and
   wherein detecting the driving safety information comprises:
     receiving the curve obstacle information from a road side unit (RSU).

5. The method according to claim 1, wherein obtaining the curve information comprises:
   receiving the curve information from a road side unit (RSU).

6. The method according to claim 1, wherein obtaining the curve information comprises:
   processing map data of the vehicle to obtain the curve information.

7. The method according to claim 1, wherein obtaining the curve information comprises:
   receiving motion trail information from a reference vehicle that has entered the curve; and
   processing the motion trail information, to obtain the curve information.

8. The method according to claim 1,
   wherein the curve information further comprises a curvature radius of the curve; and
   wherein obtaining the first safety distance comprises:
     obtaining the first safety distance based on the curvature radius of the curve.

9. The method according to claim 8, wherein obtaining the first safety distance based on the curvature radius of the curve comprises:
   performing calculation based on the curvature radius of the curve, to obtain a safety speed of the vehicle; and
   obtaining the first safety distance based on the curvature radius of the curve and the safety speed.

10. The method according to claim 8, wherein obtaining the first safety distance based on the curvature radius of the curve comprises:
    searching for mapping information based on the curvature radius of the curve, to obtain the first safety distance, wherein the mapping information comprises a mapping relationship between a safety distance and a combination of a safety speed and the curvature radius.

11. The method according to claim 1, wherein after controlling the vehicle to stop at the position outside the curve, the method further comprises performing at least one of following:
    indicating the vehicle to turn on a hazard warning signal light to perform danger signal alerting;
    indicating the vehicle to start an automatic shutdown instruction to shut down an engine;
    indicating a door to be automatically unlocked when the door is locked; or
    indicating the vehicle to activate an emergency rescue system.

12. An apparatus, comprising:
    at least one processor; and
    at least one non-transitory memory, wherein the at least one non-transitory memory is configured to store program instructions, and the at least one processor is coupled to the at least one non-transitory memory and configured to execute the program instructions to:
  detect driving safety information before a vehicle enters a curve of a road or when the vehicle has entered the curve;
  obtain a position of the vehicle in response to detecting the driving safety information;
  obtain curve information, wherein the curve information comprises at least one of a position of a start point of the curve or a position of an end point of the curve;
  determine a relative position relationship between the vehicle and the curve based on the position of the vehicle and the curve information, wherein the relative position relationship indicates whether the vehicle has entered the curve; and
  control, based on the relative position relationship, the vehicle to stop at a position outside the curve;
  wherein when the relative position relationship indicates that the vehicle has not entered the curve, controlling the vehicle to stop at the position outside the curve comprises:
    controlling the vehicle to stop at a position before the start point of the curve or controlling the vehicle to stop at a position after the end point of the curve; and
  wherein when the relative position relationship indicates that the vehicle has entered the curve, controlling the vehicle to stop at the position outside the curve comprises:
    obtaining a first safety distance, wherein the first safety distance is a maximum braking distance of the vehicle for preventing a vehicle behind from colliding with the vehicle;
    detecting a parked vehicle at the position that is greater than or equal to the first safety distance from the end point of the curve;
    obtaining a second safety distance based on the position of the parked vehicle and the first safety distance, wherein the second safety distance is greater than the first safety distance; and
    controlling the vehicle to stop at a position that is greater than or equal to the second safety distance from the end point of the curve.

13. The apparatus according to claim 12,
  wherein the driving safety information is system fault information, and the system fault information indicates that a system fault occurs in the vehicle; and
  wherein detecting the driving safety information comprises:
    obtaining the system fault information by detecting a system status of the vehicle.

14. The apparatus according to claim 12,
  wherein the driving safety information is environmental risk information, and the environmental risk information indicates that a driving environment of the vehicle does not meet a risk range preset in an automated driving system; and
  wherein detecting the driving safety information comprises:
    obtaining the environmental risk information by detecting a condition of an environment in which the vehicle is located.

15. The apparatus according to claim 12,
  wherein the driving safety information is curve obstacle information, and the curve obstacle information indicates that there is an obstacle blocking traffic in the curve; and
  wherein detecting the driving safety information comprises:
    receiving the curve obstacle information from a road side unit (RSU).

16. The apparatus according to claim 12, wherein obtaining the curve information comprises:
  receiving the curve information from a road side unit (RSU).

17. The apparatus according to claim 12, wherein obtaining the curve information comprises:
  processing map data of the vehicle to obtain the curve information.

18. The apparatus according to claim 12, wherein obtaining the curve information comprises:
  receiving motion trail information from a reference vehicle that has entered the curve; and
  processing the motion trail information, to obtain the curve information.

19. The apparatus according to claim 12,
  wherein the curve information further comprises a curvature radius of the curve; and
  wherein obtaining the first safety distance comprises obtaining the first safety distance based on the curvature radius of the curve.

20. The apparatus according to claim 19, wherein obtaining the first safety distance based on the curvature radius of the curve comprises:
  performing calculation based on the curvature radius of the curve, to obtain a safety speed of the vehicle; and
  obtaining the first safety distance based on the curvature radius of the curve and the safety speed.

21. The apparatus according to claim 19, wherein obtaining the first safety distance based on the curvature radius of the curve comprises:
  searching for mapping information based on the curvature radius of the curve, to obtain the first safety distance, wherein the mapping information comprises a mapping relationship between a safety distance and a combination of a safety speed and the curvature radius.

22. The apparatus according to claim 12, wherein after controlling the vehicle to stop at the position outside the curve, the at least one processor executes the program instructions further to:
  indicate the vehicle to turn on a hazard warning signal light to perform danger signal alerting;
  indicate the vehicle to start an automatic shutdown instruction to shut down an engine;
  indicate a door to be automatically unlocked when the door is locked; or
  indicate the vehicle to activate an emergency rescue system.

23. A non-transitory computer-readable medium storing computer-executable instructions that, when executed by at least one processor, cause an apparatus to:
  detect driving safety information before a vehicle enters a curve of a road or when the vehicle has entered the curve;
  obtain a position of the vehicle in response to detecting the driving safety information;
  obtain curve information, wherein the curve information comprises at least one of a position of a start point of the curve or a position of an end point of the curve;
  determine a relative position relationship between the vehicle and the curve based on the position of the vehicle and the curve information, wherein the relative position relationship indicates whether the vehicle has entered the curve; and control, based on the relative position relationship, the vehicle to stop at a position outside the curve;

wherein when the relative position relationship indicates that the vehicle has not entered the curve, controlling the vehicle to stop at the position outside the curve comprises:

controlling the vehicle to stop at a position before the start point of the curve or controlling the vehicle to stop at a position after the end point of the curve; and wherein when the relative position relationship indicates that the vehicle has entered the curve, controlling the vehicle to stop at the position outside the curve comprises:

obtaining a first safety distance, wherein the first safety distance is a maximum braking distance of the vehicle for preventing a vehicle behind from colliding with the vehicle;

detecting a parked vehicle at the position that is greater than or equal to the first safety distance from the end point of the curve;

obtaining a second safety distance based on the position of the parked vehicle and the first safety distance, wherein the second safety distance is greater than the first safety distance; and controlling the vehicle to stop at a position that is greater than or equal to the second safety distance from the end point of the curve.

24. The non-transitory computer-readable medium according to claim 23, wherein the driving safety information is system fault information, and the system fault information indicates that a system fault occurs in the vehicle; and wherein detecting the driving safety information comprises:

obtaining the system fault information by detecting a system status of the vehicle.

25. The non-transitory computer-readable medium according to claim 23, wherein the driving safety information is environmental risk information, and the environmental risk information indicates that a driving environment of the vehicle does not meet a risk range preset in an automated driving system; and wherein detecting the driving safety information comprises:

obtaining the environmental risk information by detecting a condition of an environment in which the vehicle is located.

26. The non-transitory computer-readable medium according to claim 23, wherein the driving safety information is curve obstacle information, and the curve obstacle information indicates that there is an obstacle blocking traffic in the curve; and wherein detecting the driving safety information comprises:

receiving the curve obstacle information from a road side unit (RSU).

27. The non-transitory computer-readable medium according to claim 23, wherein obtaining the curve information comprises:

receiving the curve information from a road side unit (RSU).

28. The non-transitory computer-readable medium according to claim 23, wherein when executed by the at least one processor, the computer-executable instructions further cause the apparatus to:

processing map data of the vehicle to obtain the curve information.

29. The non-transitory computer-readable medium according to claim 23, wherein obtaining the curve information comprises:

receiving motion trail information from a reference vehicle that has entered the curve; and processing the motion trail information, to obtain the curve information.

* * * * *